(12) United States Patent
Hirose et al.

(10) Patent No.: US 10,741,819 B2
(45) Date of Patent: Aug. 11, 2020

(54) ELECTRICITY STORAGE DEVICE AND METHOD FOR MANUFACTURING ELECTRICITY STORAGE DEVICE

(71) Applicant: KABUSHIKI KAISHA TOYOTA JIDOSHOKKI, Kariya-shi, Aichi-ken (JP)

(72) Inventors: Takayuki Hirose, Kariya (JP); Motoaki Okuda, Kariya (JP); Hiroyasu Nishihara, Kariya (JP); Kojiro Tamaru, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 192 days.

(21) Appl. No.: 15/559,531

(22) PCT Filed: Feb. 25, 2016

(86) PCT No.: PCT/JP2016/055680
§ 371 (c)(1),
(2) Date: Sep. 19, 2017

(87) PCT Pub. No.: WO2016/152372
PCT Pub. Date: Sep. 29, 2016

(65) Prior Publication Data
US 2018/0123110 A1 May 3, 2018

(30) Foreign Application Priority Data

Mar. 23, 2015 (JP) ................................. 2015-059791
Jun. 12, 2015 (JP) ................................. 2015-119412

(51) Int. Cl.
*H01M 2/26* (2006.01)
*H01M 10/04* (2006.01)
(Continued)

(52) U.S. Cl.
CPC ............ *H01M 2/266* (2013.01); *H01G 11/74* (2013.01); *H01G 11/82* (2013.01);
(Continued)

(58) Field of Classification Search
CPC .. H01M 2/263; H01M 2/266; H01M 10/0585; H01M 10/0525; H01M 4/0404; H01G 11/82; H01G 11/76
See application file for complete search history.

(56) References Cited

U.S. PATENT DOCUMENTS

2016/0336545 A1* 11/2016 Wakimoto ............ H01M 2/345
2016/0336580 A1* 11/2016 Wakimoto ............ H01M 2/345

FOREIGN PATENT DOCUMENTS

JP  2002-298823 A  10/2002
JP  2013-161757 A  8/2013
(Continued)

OTHER PUBLICATIONS

Machine translation of JP2013-161757. (Year: 2013).*
(Continued)

*Primary Examiner* — Eric R Smith
(74) *Attorney, Agent, or Firm* — Sughrue Mion, PLLC

(57) ABSTRACT

A tab bundle has a first bent portion, which is at a first end in the stacking direction L of an electrode assembly in a laminated state and is bent toward a second end in the stacking direction L of the electrode assembly, and an extended portion, which protrudes from the first bent portion in the stacking direction L. The tab bundle is electrically connected to a conductive member by means of a conduction part, which is located in the extended portion. The conductive member includes: a fixed piece, which is fixed to the inner surface of a lid member and located between the extended portion and the lid member, and a connecting piece, which intersects the fixed piece and protrudes toward (Continued)

the electrode assembly. The tab bundle is electrically connected to the connecting piece by means of the conduction part, which is located in the extended portion.

3 Claims, 11 Drawing Sheets

(51) Int. Cl.
*H01M 10/0585* (2010.01)
*H01G 11/74* (2013.01)
*H01G 11/82* (2013.01)
*H01M 4/04* (2006.01)
*H01G 11/76* (2013.01)
*H01M 10/052* (2010.01)
*H01M 10/0525* (2010.01)
*H01M 10/0587* (2010.01)

(52) U.S. Cl.
CPC ......... *H01M 4/0404* (2013.01); *H01M 10/04* (2013.01); *H01M 10/052* (2013.01); *H01M 10/0585* (2013.01); *H01G 11/76* (2013.01); *H01M 10/0525* (2013.01); *H01M 10/0587* (2013.01); *H01M 2220/20* (2013.01); *Y02E 60/13* (2013.01)

(56) References Cited

FOREIGN PATENT DOCUMENTS

| JP | 2014-017053 A | 1/2014 | |
|---|---|---|---|
| JP | 2014-067532 A | 4/2014 | |
| JP | 2015-032549 A | 2/2015 | |
| JP | 2016219123 A * | 12/2016 | ............ H01M 2/345 |

OTHER PUBLICATIONS

International Search Report for PCT/JP2016/055680 dated May 31, 2016 [PCT/ISA/210].
Written Opinion for PCT/JP2016/055680 dated May 31, 2016 [PCT/ISA/237].
International Preliminary Report on Patentability with translation of Written Opinion dated Sep. 26, 2017, issued by the International Searching Authority in application No. PCT/JP2016/055680.

* cited by examiner

ELECTRICITY STORAGE DEVICE AND METHOD FOR MANUFACTURING ELECTRICITY STORAGE DEVICE

CROSS REFERENCE TO RELATED APPLICATIONS

This application is a National Stage of International Application No. PCT/JP2016/055680 filed Feb. 25, 2016, claiming priority based on Japanese Patent Application No. 2015-059791 filed Mar. 23, 2015 and Japanese Patent Application No. 2015-119412 filed Jun. 12, 2015, the contents of all of which are incorporated herein by reference in their entirety.

TECHNICAL FIELD

The present invention relates to an electricity storage device that includes conductive members, which electrically connect tab bundles to electrode terminals, and to a method for manufacturing the electricity storage device.

BACKGROUND ART

Vehicles such as electric vehicles (EV) and plug-in hybrid vehicles (PHV) include an electricity storage device for storing electric power to be supplied to the drive motor. The electricity storage device is a rechargeable battery in this case. Typically, the rechargeable battery includes a case for accommodating an electrode assembly and an electrode assembly accommodated in the case. Electric power is taken out from the rechargeable battery through electrode terminals connected to positive electrodes and negative electrodes of the electrode assembly via conductive members.

Examples of the electrode assembly include a stacked electrode assembly, in which positive electrodes and negative electrodes are stacked with separators in between, and a spiral-type electrode assembly, in which a band-like positive electrode and a band-like negative electrode are wound with a band-like separator located in between.

As shown in FIG. 19, a rechargeable battery 80 of Patent Document 1 includes an electrode assembly 89, which is accommodated in a case 88. The electrode assembly 89 includes positive electrodes 81 and negative electrodes 82. Each positive electrode 81 includes a non-illustrated positive tab, and each negative electrode 82 includes a negative tab 82a. Although not shown, the positive tabs are electrically connected to a positive conductive member in a state in which the positive tabs are stacked into a tab bundle. The positive conductive member is connected to a positive electrode terminal. The negative tabs 82a are electrically connected to a negative conductive member 83 in a state in which the negative tabs 82a are stacked into a tab bundle. The negative conductive member 83 is electrically connected to a negative electrode terminal 84. Each electrode terminal 84, which is connected to the associated conductive member, is secured to a lid in a state in which the electrode terminal 84 extends through the lid, which forms the wall of the case.

The tab bundle of the negative tabs 82a and the negative conductive member 83 are joined by a welded portion 90. The welded portion 90 electrically connects all the negative tabs 82a and the negative conductive member 83. Although not shown, similarly on the positive side, the tab bundle of the positive tabs and the positive conductive member are welded by a welded portion. The welded portion electrically connects all the positive tabs and the positive conductive member.

PRIOR ART DOCUMENT

Patent Document

Patent Document 1: Japanese Laid-Open Patent Publication No. 2014-67532

SUMMARY OF THE INVENTION

Problems that the Invention is to Solve

In the rechargeable battery 80 disclosed in Patent Document 1, the tab bundle of the negative tabs 82a and the negative conductive member 83 are joined by resistance welding, and the tab bundle of the positive tabs and the positive conductive member are joined by resistance welding. The resistance welding is performed by sandwiching each conductive member and the associated tab bundle between welding electrode rods. Thus, in Patent Document 1, after the tab bundle of the negative tabs 82a and the negative conductive member 83 are joined, and the tab bundle of the positive tabs and the positive conductive member are joined, the electrode terminals need to be joined to the conductive members, and the electrode terminals need to be secured to the lid in order to mount the electrode assembly to the lid. However, the tabs are formed of metal foil and have a low rigidity. In light of these circumstances, since the conductive members, which are integrated with the tab bundles, and the electrode assembly are easily moved and are unstable when the electrode assembly is integrated with the lid, the tabs are likely to be under load. That is, the tabs are easily damaged, and the electric resistance at the tabs is undesirably increased. It is therefore important to integrate the lid and the electrode assembly without applying load on the tabs. However, since the rigidity of the tabs is low, it is difficult to integrate the lid with the electrode assembly without applying load on the tabs.

Accordingly, it is an objective of the present invention to provide an electricity storage device that reduces load applied to tabs during operation for integrating a wall portion with an electrode assembly and a method for manufacturing the electricity storage device.

Means for Solving the Problems

To achieve the foregoing objective and in accordance with a first aspect of the present invention, an electricity storage device is provided that includes an electrode assembly, tab bundles, a case, electrode terminals, and conductive members. In the electrode assembly, electrodes of different polarities are stacked while being insulated from each other. Each electrode includes a tab, which protrudes from one side of the electrode. The electrode assembly includes a tab-side end face formed by collecting the sides of the electrodes. The tab bundles protrude from the tab-side end face of the electrode assembly. Each tab bundle includes the tabs stacked on one another. The case accommodates the electrode assembly and the tab bundles. The electrode terminals are secured to a wall portion of the case opposed to the tab bundles and transmit and receive electricity to and from the electrode assembly. The conductive members electrically connect the tab bundles to the electrode terminals and are mounted on the wall portion in a state in which the conductive members are insulated from the wall portion. Each tab bundle includes a bent portion and an extended portion. In the bent portion, the tabs are stacked at a first end in a stacking direction of the electrode assembly. The bent portion is bent toward a second end in the stacking direction of the electrode assembly. The extended portion extends from the bent portion in the stacking direction of the electrode assembly. Each conductive member includes a fixed piece and a connecting piece. The fixed piece overlaps with the wall portion of the case when the wall portion is viewed from an outer surface and is located between the extended portion and the wall portion. The connecting piece intersects the fixed piece and protrudes toward the electrode assembly. Each tab bundle is electrically connected to the connecting piece of the associated conductive member via a conduction part located at the extended portion.

With this configuration, the connecting piece of each conductive member protrudes from the associated fixed piece, which is mounted on the wall portion, toward the electrode assembly. Thus, to integrate the wall portion of the case with the electrode assembly, first, a lid terminal assembly is formed. The lid terminal assembly includes the wall portion, the conductive members, and the electrode terminals, which are integrated with one another. Subsequently, the tabs are joined to the distal end sections of the connecting pieces on the lid terminal assembly that protrude from the wall portion. Thus, unlike a case in which the conductive members are mounted on the wall portion after joining the conductive members to the tabs and forming the conduction parts, the rigidity of the tabs is improved, and the conductive members are unlikely to move with the tabs serving as starting points. This configuration stably holds the conductive members and reduces the load applied to the tabs. As described above, the configuration, in which the wall portion and the conductive members are integrally mounted and the connecting pieces protrude from the conductive members, is suitable for reducing the load applied to the tabs when the wall portion and the electrode assembly are integrated.

In the electricity storage device, a direction along the tab-side end face of the electrode assembly and in which the tabs of different polarities are arranged is an arrangement direction, and the conductive members are preferably U-shaped as viewed from the arrangement direction.

In the electricity storage device, each connecting piece preferably covers a distal end section of the associated tab bundle from a side facing the electrode assembly.

With this configuration, when the stacked tabs are joined to the conductive members, the tabs are joined to the connecting pieces, and the conduction parts are formed on the connecting pieces. Each connecting piece is then folded such that the associated tab bundle is located between the connecting piece and the associated fixed piece. At this time, simultaneously with folding each connecting piece, the section of the associated tab bundle closer to the distal end than the conduction part is covered with the connecting piece. Thus, even if the section of each tab bundle closer to the distal end than the conduction part is a free end, the distal end of each tab is prevented from contacting the case and the electrode assembly.

In the electricity storage device, each fixed piece preferably includes a first surface, which is opposed to the wall portion, and a second surface, which is parallel to the first surface. Each connecting piece preferably includes an outer surface continuous with the first surface and an inner surface continuous with the second surface, and the tabs are preferably joined to the inner surface of each connecting piece.

With this configuration, for example, compared with a case in which the tabs are joined to the outer surfaces of the connecting pieces, a dead space formed by the thickness of the tabs is reduced in the space between the connecting pieces and the tab-side end face.

In the electricity storage device, each connecting piece preferably includes a proximal end and a distal end in a direction protruding toward the electrode assembly. A thickness of the proximal end of each connecting piece differs from a thickness of the distal end of each connecting piece. Each connecting piece includes a thick portion, which is located in the vicinity of the fixed piece, and a thin portion, which is located between the thick portion and the electrode assembly and has a thickness smaller than the thickness of the thick portion. Each conductive member includes a step at a boundary between the thick portion and the thin portion. The step is where the connecting piece is bent to cover the distal end section of the associated tab bundle from the side facing the electrode assembly.

This configuration facilitates operation for folding the connecting pieces.

In the electricity storage device, a direction along the tab-side end face of the electrode assembly and in which the tabs of different polarities are arranged is preferably an arrangement direction. The fixed piece of each conductive member preferably has a rectangular shape extending in the arrangement direction. Each electrode terminal is preferably electrically connected to a first end in a longitudinal direction of the associated fixed piece. Each connecting piece preferably protrudes from a second end in the longitudinal direction of the associated fixed piece.

With this configuration, the tabs are joined to the distal end sections of the connecting pieces. Each connecting piece is located on the second end in the longitudinal direction of the associated fixed piece. Thus, each electrode terminal located on the first end in the longitudinal direction of the associated fixed piece does not overlap with the tab bundle. This reduces the size of the electricity storage device compared with a case in which each tab bundle overlaps with the associated electrode terminal.

In the electricity storage device, the electrode assembly is preferably a stacked electrode assembly, which includes a plurality of sheet-like positive electrodes and a plurality of sheet-like negative electrodes stacked in a state in which the electrodes of different polarities are insulated from one another.

With this configuration, in the stacked electrode assembly, the tabs are stacked simultaneously with stacking the electrodes to manufacture the electrode assembly. The tabs and the connecting pieces are easily joined by overlapping with the connecting pieces of the conductive members on the stacked tabs. Thus, the stacked electrode assembly facilitates the joining operation of the tabs and the connecting pieces.

The above-described electricity storage is preferably a rechargeable battery.

To achieve the foregoing objective and in accordance with a second aspect of the present invention, a method for manufacturing an electricity storage device is provided. The electricity storage device includes an electrode assembly, tab bundles, a case, electrode terminals, and conductive members. In the electrode assembly, electrodes of different polarities are stacked while being insulated from each other. Each electrode includes a tab, which protrudes from one side of the electrode. The electrode assembly includes a tab-side end face formed by collecting the sides of the electrodes. The tab bundles protrude from the tab-side end face of the electrode assembly. Each tab bundle includes the tabs stacked on one another. The case accommodates the electrode assembly and the tab bundles. The electrode terminals are secured to a wall portion of the case opposed to the tab bundles and transmit and receive electricity to and from the electrode assembly. The conductive members electrically connect the tab bundles to the electrode terminals and are mounted on the wall portion in a state in which the conductive members are insulated from the wall portion. Each conductive member includes a fixed piece and a connecting piece. The fixed piece overlaps with the wall portion when the wall portion is viewed from an outer surface and includes a first surface and a second surface, which is parallel to the first surface. The connecting piece intersects the fixed piece and protrudes in a direction away from the wall portion. The method includes stacking the electrodes of different polarities in a state in which the electrodes are insulated from one another to form the electrode assembly and stacking the tabs, mounting the conductive members on the wall portion with the first surface of each fixed piece opposed to the wall portion, joining the tabs to a distal end section of each connecting piece in a state in which the tabs are stacked on a first end in a stacking direction of the electrode assembly to form a conduction part that electrically connects the tabs and the associated conductive member, and, after forming the conduction part, folding the distal end section of each connecting piece such that the distal end section of the connecting piece approaches the second surface of the fixed piece to fold the tabs at a section closer to a distal end than the conduction part.

With this configuration, when the wall portion of the case is integrated with the electrode assembly, first, the lid terminal assembly is formed, in which the wall portion, the conductive members, and the electrode terminals are integrated. Subsequently, the tabs of the electrode assembly are joined to the connecting pieces of the lid terminal assembly. The connecting pieces protrude from the wall portion. Thus, unlike the case in which the conductive members are mounted on the wall portion after joining the conductive members to the tabs and forming the conduction parts, the rigidity of the tabs is improved, and the conductive members are unlikely to move with the tabs serving as the starting points. Thus, the conductive members are held stably, and the load applied to the tabs is reduced. The configuration also facilitates manufacturing of the electricity storage device.

In the method for manufacturing the electricity storage device, each connecting piece preferably includes an outer surface continuous with the first surface of the fixed piece and an inner surface continuous with the second surface of the fixed piece. The method preferably further includes, after joining the tabs to the inner surface of each connecting piece, folding the distal end section of each connecting piece such that the inner surface of the connecting piece approaches the second surface of the fixed piece to cover a distal end section of the tabs from a side facing the electrode assembly.

With this configuration, by folding the distal end section of each connecting piece, the section of the associated tab bundle closer to the distal end than the conduction part is sandwiched between the fixed piece and the connecting piece to be protected by the connecting piece. Thus, even if the section of the tab bundle closer to the distal end than the conduction part is a free end, the distal end of the tab bundle is prevented from contacting the case and the electrode assembly.

The method for manufacturing the electricity storage device preferably further includes, before joining the tabs to each connecting piece, forming the connecting piece to protrude from the associated fixed piece in a direction orthogonal to the wall portion, and, after joining the tabs to each connecting piece, folding the distal end section of each connecting piece such that the connecting piece overlaps with the wall portion and is parallel to the wall portion.

With this configuration, since the distal end section of each connecting piece is parallel to the wall portion, the distal end section of the connecting piece is folded to be orthogonal to the proximal end section. In this case, unlike a case in which the connecting piece is hardly folded, the connecting piece is prevented from contacting the tab-side end face.

Effects of the Invention

The present invention reduces the load applied to the tabs during operation for integrating the wall portion and the electrode assembly.

MODES FOR CARRYING OUT THE INVENTION

First Embodiment

Hereinafter, an electricity storage device and a method for manufacturing the electricity storage device according to a first embodiment will be described with reference to FIGS. 1 to 8. The power storage device is applied to a rechargeable battery, and the method is applied to the manufacture of a rechargeable battery.

Figure 1:
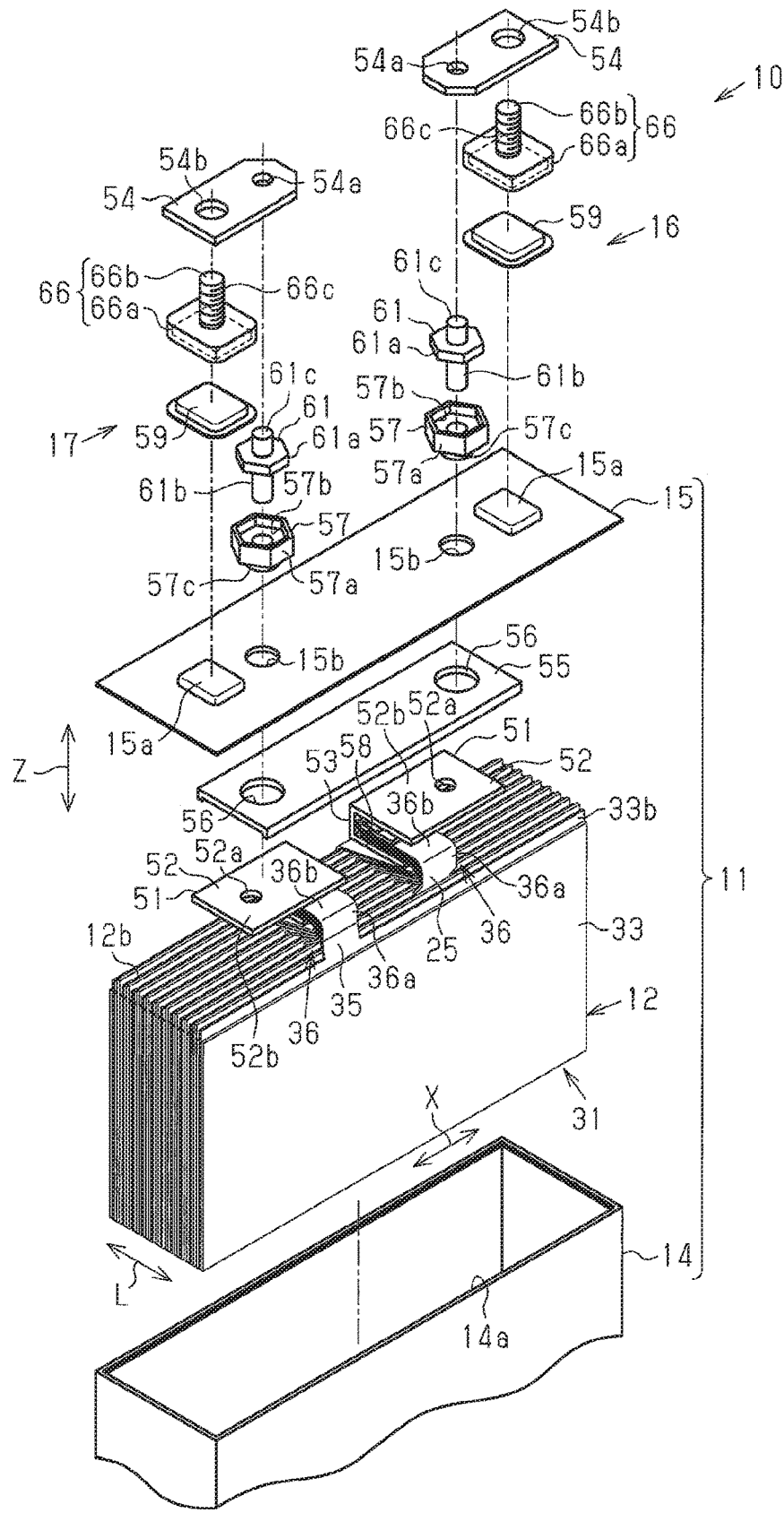
FIG. 1 is an exploded perspective view of a rechargeable battery that incorporates an electricity storage device of the present invention.
Figure 2:
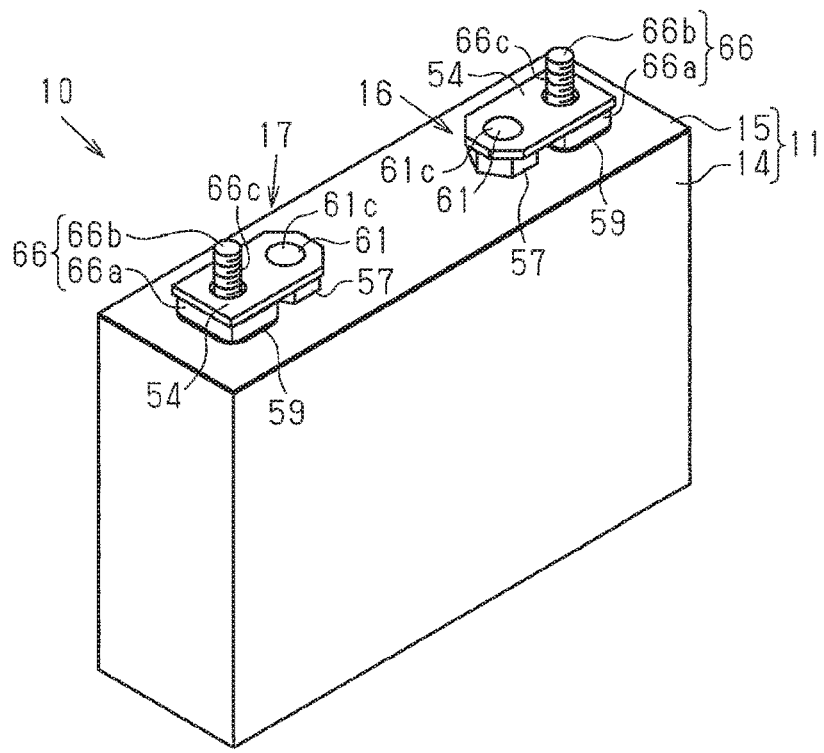
FIG. 2 is a perspective view of the rechargeable battery.

As shown in FIGS. 1 and 2, an electricity storage device, which is a rechargeable battery 10 in this embodiment, includes a case 11. The case 11 accommodates an electrode assembly 12 and positive and negative tab bundles 36. The case 11 includes a rectangular box-like case member 14 and a lid member 15. The lid member 15 is a rectangular flat plate-like wall portion and closes an opening portion 14a of the case member 14. The rechargeable battery 10 is a lithium-ion battery. A positive terminal 16 and a negative terminal 17 are electrically connected to the electrode assembly 12. The positive terminal 16 and the negative terminal 17 are electrode terminals for transmitting and receiving electricity to and from the electrode assembly 12.

Figure 3:
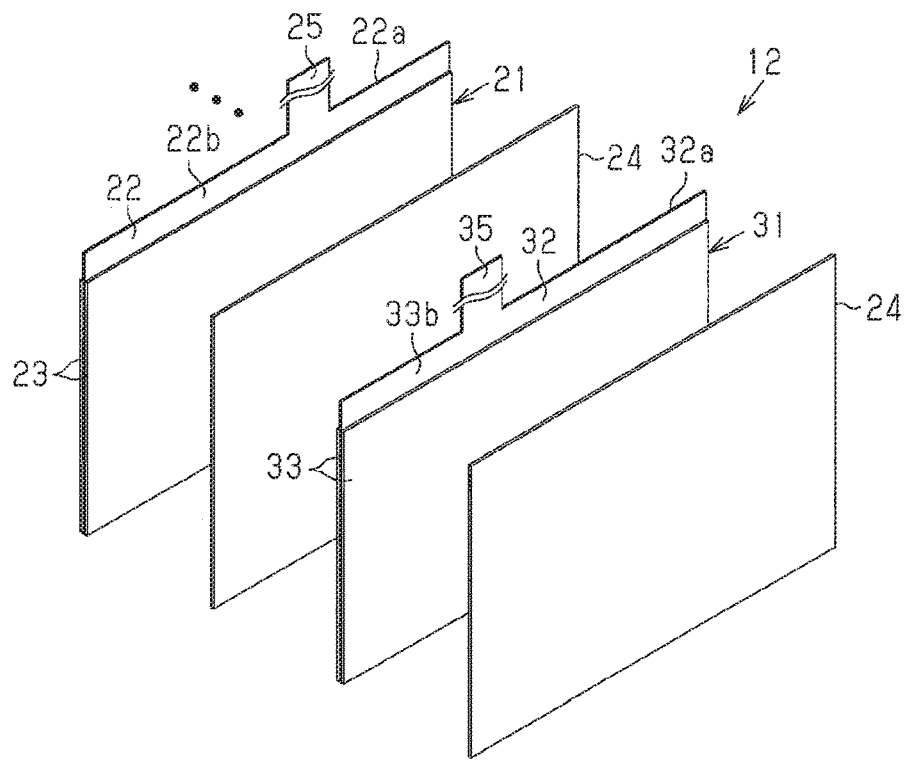
FIG. 3 is an exploded perspective view of the electrode assembly.

As shown in FIG. 3, the electrode assembly 12 includes sheet-like positive electrodes 21 and sheet-like negative electrodes 31. The polarity of the positive electrodes 21 differs from the polarity of the negative electrodes 31. Each positive electrode 21 includes a positive metal foil 22 and positive active material layers 23, which are formed by applying a positive active material on both sides of the positive metal foil 22. Each negative electrode 31 includes a negative metal foil 32 and negative active material layers 33, which are formed by applying a negative active material on both sides of the negative metal foil 32. The positive metal foil 22 is an aluminum foil, and the negative metal foil 32 is a copper foil. The electrode assembly 12 is a stacked electrode assembly, in which the positive electrodes 21 and the negative electrodes 31 are stacked with insulative separators 24 located in between.

Each positive electrode 21 includes a positive uncoated portion 22b, on which the positive active material is not applied along one side 22a of the positive metal foil 22. Each positive electrode 21 includes a tab 25, which protrudes from part of the side 22a. Each negative electrode 31 includes a negative uncoated portion 33b, on which the negative active material is not applied along one side 32a of the negative metal foil 32. Each negative electrode 31 includes a tab 35, which protrudes from part of the side 32a.

As shown in FIG. 1, with the positive electrodes 21 and the negative electrodes 31 being stacked on one another, the positive tabs 25 are provided not to overlap with the negative tabs 35, and the negative tabs 35 are provided not to overlap with the positive tabs 25. The electrode assembly 12 includes a tab-side end face 12b. The tab-side end face 12b is formed by collecting the sides 22a of the positive electrodes 21, the sides 32a of the negative electrodes 31, and sides of the separators 24. The positive electrodes 21 are stacked such that the tabs 25 are arranged in a stacking direction L. Similarly, the negative electrodes 31 are stacked such that the tabs 35 are arranged in the stacking direction L.

The rechargeable battery 10 includes the positive tab bundle 36, which protrudes from the tab-side end face 12b. The tab bundle 36 is formed by collecting all the positive tabs 25 on a first end in the stacking direction L of the electrode assembly 12 and then stacking the positive tabs 25. The rechargeable battery 10 includes the negative tab bundle 36, which protrudes from the tab-side end face 12b. The tab bundle 36 is formed by collecting all the negative tabs 35 on the first end of the electrode assembly 12 and then stacking the negative tabs 35. The inner surface of the lid member 15 faces the tab bundles 36, which are accommodated in the case 11, and the tab-side end face 12b of the electrode assembly 12. Hereinafter, a direction along the tab-side end face 12b and in which the tab bundle 36 that includes the positive tabs 25 and the tab bundle 36 that includes the negative tabs 35 are arranged will be referred to as an arrangement direction X. Also, the direction in which the inner surface of the lid member 15 and the tab-side end face 12b of the electrode assembly 12 are connected by the shortest distance will be referred to as an opposing direction Z.

A positive conductive member 51 is joined to the positive tab bundle 36. The positive conductive member 51 electrically connects the electrode assembly 12 to the positive terminal 16. A negative conductive member 51 is joined to the negative tab bundle 36. The negative conductive member 51 electrically connects the electrode assembly 12 to the negative terminal 17.

Figure 5:
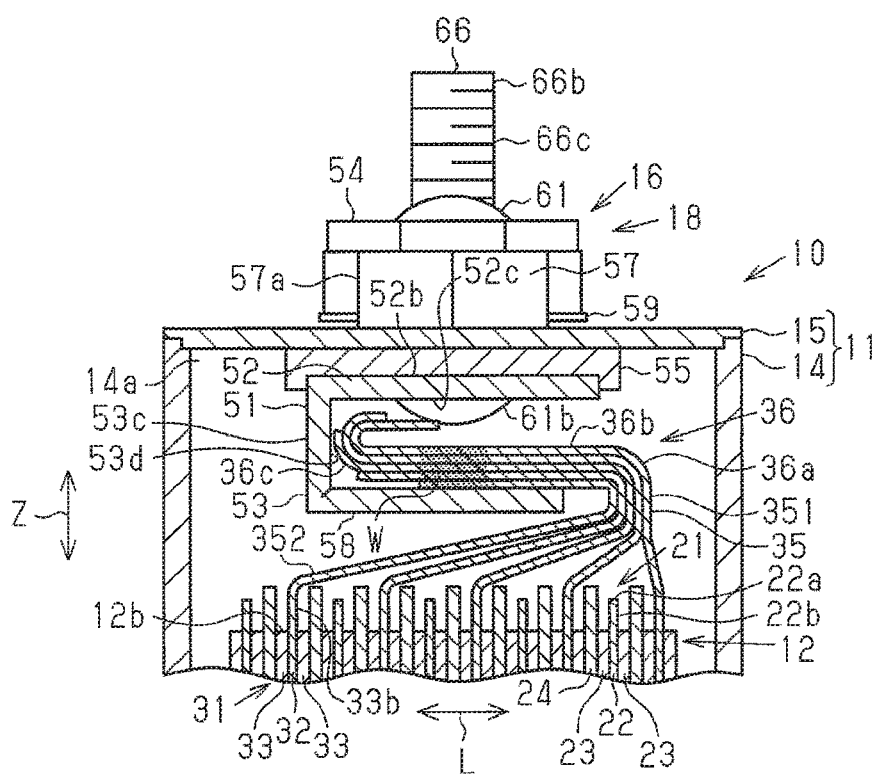
FIG. 5 is a partial cross-sectional view illustrating a state in which the tab bundle and the conductive member are joined.

Next, the joining structure of the positive tab bundle 36 and the conductive member 51, and the joining structure of the negative tab bundle 36 and the conductive member 51 will be described with reference to FIG. 5. FIG. 5 illustrates the joining structure of the negative tab bundle 36 and the conductive member 51. The joining structure is the same as the joining structure of the positive tab bundle 36 and the conductive member 51. Thus, the description of the joining structure of the positive tab bundle 36 and the conductive member 51 will be omitted. The following description applies to the joining structure of the positive tab bundle 36 and the positive conductive member 51 by replacing the term "negative" with "positive".

As shown in FIG. 5, in the negative tab bundle 36, one of the tabs 35 located on the first end of the electrode assembly 12 will be referred to as a first tab 351. In the negative tab bundle 36, one of the tabs 35 located on a second end of the electrode assembly 12 will be referred to as a second tab 352. In this case, the tabs 35 are collected to the first end of the electrode assembly 12 such that the second tab 352 approaches the first tab 351. That is, the tabs 35 that are independent of each other when being stacked are collected toward the first tab 351. The negative tab bundle 36 and the conductive member 51 are joined by forming a conduction part W by performing resistance welding while the conductive member 51 is in contact with the second tab 352. In this manner, the negative tab bundle 36 and the conductive member 51 are electrically connected.

In the first embodiment, the tabs 35 are formed to be the same size. Thus, in the stacking direction L of the electrode assembly 12, the greater the distance of the tab 35 from the first tab 351, the shorter becomes the length of the tab 35 collected at the negative tab bundle 36. Thus, the conduction part W for electrically connecting all the tabs 35 is formed at an overlapping area of the second tab 352 with other tabs 35. The negative tab bundle 36 includes a free end at a position closer to the distal end than the conduction part W. None of the tabs 35 are welded on the free end. The free end of the negative tab bundle 36 is not joined to the conductive member 51.

The negative tab bundle 36 includes a first bent portion 36a. The first bent portion 36a is bent from the first end of the electrode assembly 12 toward the second end. The negative tab bundle 36 includes an extended portion 36b.

The extended portion 36b extends from the first bent portion 36a in the stacking direction L of the electrode assembly 12. The extended portion 36b includes the conduction part W. Furthermore, the negative tab bundle 36 includes a second bent portion 36c. The second bent portion 36c is located closer to the distal end than the extended portion 36b. The second bent portion 36c is formed at a position closer to the distal end than the conduction part W. The negative tab bundle 36 is folded back at the second bent portion 36c toward the first end of the electrode assembly 12.

The conductive member 51 includes a fixed piece 52 and a connecting piece 53. The fixed piece 52 is located between the extended portion 36b and the lid member 15. The connecting piece 53 is joined to the tab bundle 36. The connecting piece 53 intersects the fixed piece 52 and protrudes from the fixed piece 52 toward the electrode assembly 12. The connecting piece 53 includes a proximal end in the vicinity of the lid member 15. The proximal end of the connecting piece 53 is located between the second bent portion 36c and the second end of the electrode assembly 12. The connecting piece 53 includes a distal end in the vicinity of the electrode assembly 12. The distal end of the connecting piece 53 is located between the extended portion 36b and the tab-side end face 12b of the electrode assembly 12.

The conductive member 51 before being connected to the negative tab bundle 36 will now be described.

Figure 4:
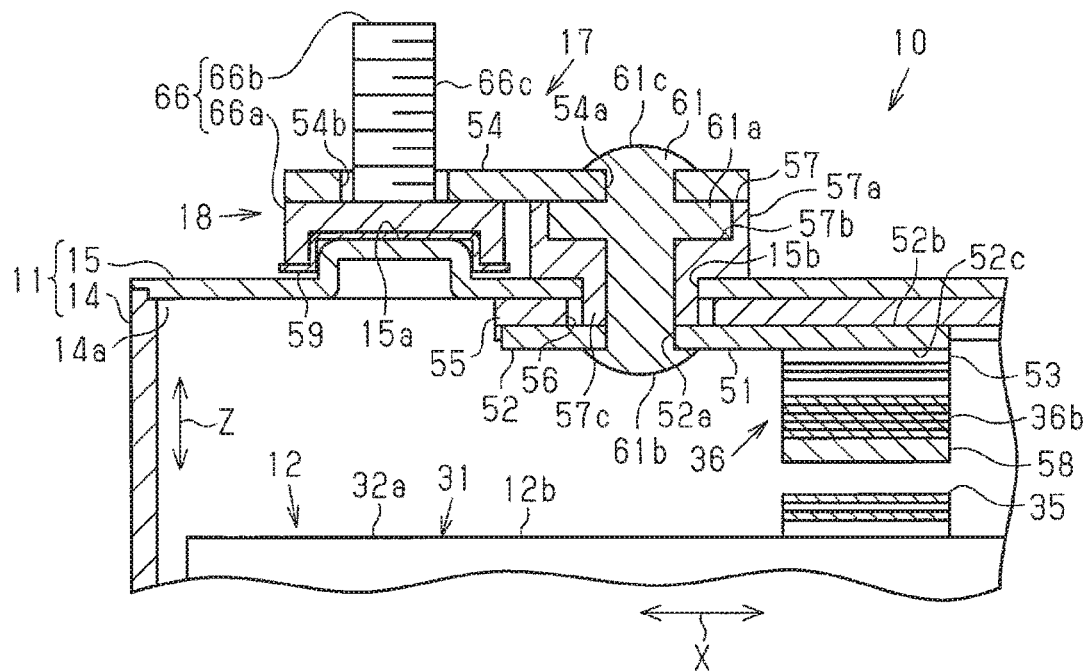
FIG. 4 is a partial cross-sectional view illustrating a state in which the tab bundle, the conductive member, the auxiliary terminal, and the external terminal are joined.
Figure 6A:
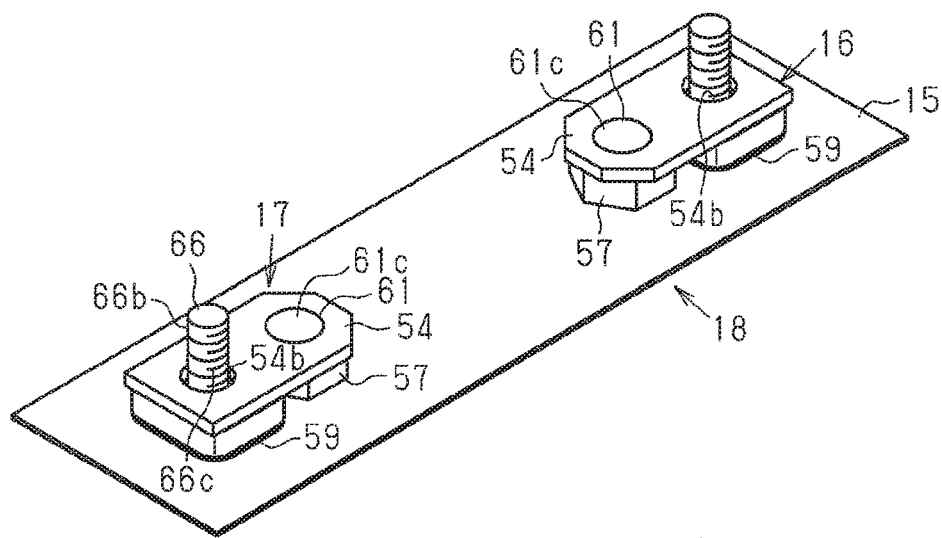
FIG. 6A is a perspective view of the auxiliary terminals and the external terminals integrated with the lid member.
Figure 6B:
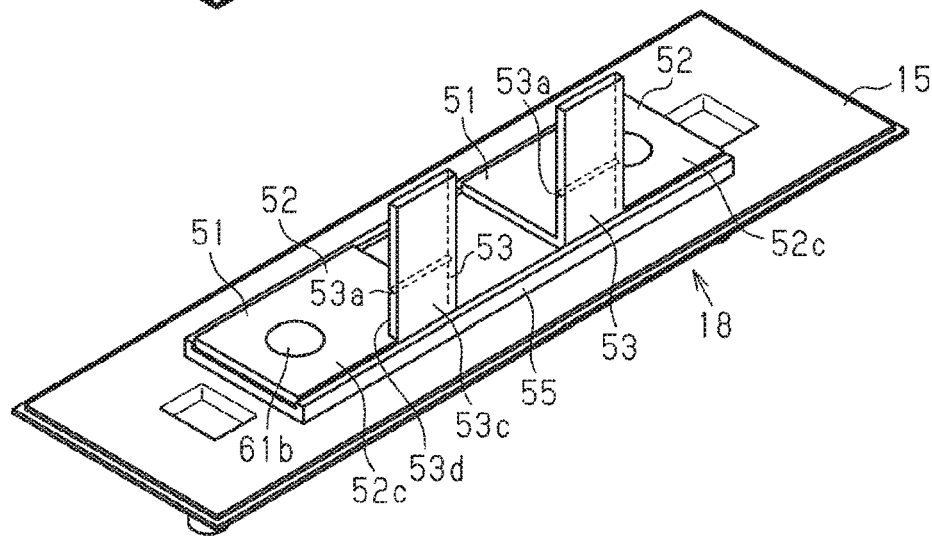
FIG. 6B is a perspective view of the conductive members integrated with the lid member.

As shown in FIGS. 4 and 6B, the fixed piece 52 is formed into a rectangular plate-like shape extending in the arrangement direction X. The conductive member 51 is secured to the inner surface of the lid member 15 via an inner insulating cover 55, which will be described below. The conductive member 51 includes an insertion hole 52a at a first end in the longitudinal direction of the fixed piece 52. An auxiliary terminal 61, which will be described below, is capable of being inserted in the insertion hole 52a. The conductive member 51 includes the connecting piece 53 at a second end in the longitudinal direction of the fixed piece 52. The connecting piece 53 has a rectangular shape and protrudes from one of the long sides of the fixed piece 52. The length of the short sides of the fixed piece 52 is less than the length of the short sides of the lid member 15. The fixed piece 52 includes a first surface 52b and a second surface 52c. The first surface 52b is opposed to the inner surface of the lid member 15 via the inner insulating cover 55. The second surface 52c is parallel to the first surface 52b and opposed to the tab-side end face 12b of the electrode assembly 12.

One of the two largest rectangular surfaces of the connecting piece 53 that is continuous with the first surface 52b of the fixed piece 52 is referred to as an outer surface 53c, and the other, which is continuous with the second surface 52c of the fixed piece 52, is referred to as an inner surface 53d. The direction extending along the outer surface 53c and the inner surface 53d of the connecting piece 53 and orthogonal to the direction in which the connecting piece 53 protrudes from the fixed piece 52 is referred to as a lateral direction. The length of the short sides of the connecting piece 53 is slightly greater than or equal to the maximum length of the tab bundle 36 in the arrangement direction X.

As shown in FIG. 5, the connecting piece 53 includes a folded portion 58 at a distal end located apart from the fixed piece 52, that is, at a portion in the vicinity of the electrode assembly 12. The folded portion 58 covers the extended portion 36b of the tab bundle 36 from the side facing the electrode assembly 12. The folded portion 58 overlaps with the lid member 15 and the fixed piece 52 when the lid member 15 is viewed from the outer surface and is parallel to the lid member 15. Thus, the outer surface 53c and the inner surface 53d of the folded portion 58 of the connecting piece 53 are parallel to the first surface 52b and the second surface 52c of the fixed piece 52.

The second tab 352 of the tab bundle 36 is joined in a state in which the second tab 352 contacts the inner surface 53d of the folded portion 58. The folded portion 58 covers the section of the extended portion 36b closer to the distal end than the conduction part W from the side facing the electrode assembly 12. The conductive member 51 is U-shaped as viewed from the arrangement direction X. The portion of the tab bundle 36 located closer to the distal end than the first bent portion 36a, that is, the extended portion 36b and the portion closer to the distal end than the second bent portion 36c are on the inner side of the conductive member 51.

As shown in FIGS. 5, 6A, and 6B the folded portion 58 is formed by folding the distal end of the connecting piece 53. A groove 53a that is recessed from the inner surface 53d toward the outer surface 53c exists at the folding section of the folded portion 58 before forming the folded portion 58. The groove 53a is located along the entire lateral length of the connecting piece 53 and extends straight in the lateral direction. The plate-like folded portion 58 is formed on the distal end in the longitudinal direction of the connecting piece 53 by folding the connecting piece 53 at the groove 53a.

The inner insulating cover 55 of the rechargeable battery 10 will now be described.

As shown in FIG. 1, the rechargeable battery 10 includes the inner insulating cover 55 in the case 11. The inner insulating cover 55 is located between the negative and positive conductive members 51 and the lid member 15. The inner insulating cover 55 includes through-holes 56 at the opposite ends in the longitudinal direction.

The rechargeable battery 10 includes the positive terminal 16 and the negative terminal 17, which are secured to the lid member 15. The positive terminal 16 and the negative terminal 17 respectively include the auxiliary terminal 61, which is secured to the lid member 15 via the above-described inner insulating cover 55, and an outer insulating member 57, which will be described below. The positive auxiliary terminal 61 is made of aluminum, and the negative auxiliary terminal 61 is made of copper. Each auxiliary terminal 61 includes a prism-shaped base portion 61a, a first crimp portion 61b, which protrudes from the upper surface of the base portion 61a, and a second crimp portion 61c, which protrudes from the lower surface of the base portion 61a.

Each auxiliary terminal 61 is insulated from the lid member 15 by the associated outer insulating member 57. Each outer insulating member 57 is tubular and includes a base support portion 57a at an axial end. The base support portion 57a includes an auxiliary terminal recess 57b to which the base portion 61a is fitted. Each outer insulating member 57 includes a cylindrical shaft portion 57c, which has a diameter smaller than the diameter of the base support portion 57a and is inserted into a terminal insertion hole 15b in the lid member 15.

The configuration of the positive terminal 16 and the negative terminal 17 will now be described. FIG. 4 illustrates the configuration of the negative terminal 17. The configuration of the positive terminal 16 is the same as the configuration of the negative terminal 17, and the illustration of the positive terminal 16 is omitted. The description of the negative terminal 17 applies to the positive terminal 16 by replacing the term "negative" with "positive".

As shown in FIG. 4, the base support portion 57a of the outer insulating member 57 is located on the outer surface of the lid member 15, and the shaft portion 57c of the outer insulating member 57 is fitted in the associated terminal insertion hole 15b of the lid member 15. The shaft portion 57c is also inserted in the associated through-hole 56 of the inner insulating cover 55.

In a state in which the base portion 61a of the auxiliary terminal 61 is fitted in the auxiliary terminal recess 57b, the first crimp portion 61b extends through the shaft portion 57c of the outer insulating member 57 and the insertion hole 52a of the conductive member 51 and is crimped to the conductive member 51. In this manner, the auxiliary terminal 61 is fixed to the lid member 15. The auxiliary terminal 61 is electrically connected to the negative electrodes 31 of the electrode assembly 12 by connecting the first crimp portion 61b to the conductive member 51 by crimping. The auxiliary terminal 61 sandwiches the lid member 15 together with the outer insulating member 57 and the inner insulating cover 55 and is secured to the lid member 15 in a state in which the auxiliary terminal 61 is insulated from the lid member 15.

The lid member 15 includes rotation prevention portions 15a in the vicinity of the opposite ends in the longitudinal direction and at positions outward of the terminal insertion holes 15b. The rotation prevention portions 15a have a rectangular shape and are projections formed by pressing a metal plate of the lid member 15 outward. An external terminal 66 is placed on each rotation prevention portion 15a via a substantially rectangular cup-shaped terminal insulator 59. The external terminals 66 are made of metal. Each external terminal 66 has a rectangular box-like shape and includes a base 66a and a post 66b, which protrudes from the base 66a. Each rotation prevention portion 15a is fitted in the associated base 66a via the terminal insulator 59. Each post 66b includes an external thread 66c on the outer circumferential surface. Each terminal insulator 59 insulates between the associated external terminal 66 and the lid member 15.

The rechargeable battery 10 includes rectangular flat plate-like connecting conductors 54. Each connecting conductor 54 includes a crimp portion insertion hole 54a on a first end in the longitudinal direction and a post insertion hole 54b on a second end in the longitudinal direction. The post 66b of each external terminal 66 is inserted in the post insertion hole 54b of the associated connecting conductor 54 from the side facing the lid member 15. The second crimp portion 61c of each auxiliary terminal 61 is inserted in the crimp portion insertion hole 54a of the associated connecting conductor 54 from the side facing the lid member 15. Each second crimp portion 61c is crimped at a position outward of the associated connecting conductor 54. Thus, each connecting conductor 54 is connected and secured to the associated auxiliary terminal 61, but the post 66b of each external terminal 66 is only inserted in the associated post insertion hole 54b. Each connecting conductor 54 contacts the base 66a of the associated external terminal 66 to be electrically connected.

The positive external terminal 66 is electrically connected to the positive tab bundle 36 of the positive electrodes 21 via the connecting conductor 54, the auxiliary terminal 61, and the conductive member 51. Thus, the positive terminal 16 is electrically connected to the first end in the longitudinal direction of the associated conductive member 51, and the positive tab bundle 36 is electrically connected to the second end in the longitudinal direction of the associated conductive member 51. Thus, the positive terminal 16 is capable of transmitting and receiving electricity to and from the electrode assembly 12 via the associated conductive member 51.

The negative external terminal 66 is electrically connected to the tab bundle 36 of the negative electrodes 31 via the connecting conductor 54, the auxiliary terminal 61, and the conductive member 51. Thus, the negative terminal 17 is electrically connected to the first end in the longitudinal direction of the associated conductive member 51, and the negative tab bundle 36 is electrically connected to the second end in the longitudinal direction of the associated conductive member 51. Thus, the negative terminal 17 is capable of transmitting and receiving electricity to and from the electrode assembly 12 via the associated conductive member 51.

The operation of the rechargeable battery 10 will now be described together with the method for manufacturing the rechargeable battery 10.

First, the positive electrodes 21 and the negative electrodes 31 are stacked on one another with the separators 24 located in between to form the electrode assembly 12.

Next, the shaft portion 57c of each outer insulating member 57 is fitted in the associated terminal insertion hole 15b in the lid member 15 and inserted in the associated through-hole 56 in the inner insulating cover 55. Subsequently, the first crimp portion 61b of each auxiliary terminal 61 is inserted in the associated outer insulating member 57, and the base portion 61a of each auxiliary terminal 61 is accommodated in the associated auxiliary terminal recess 57b. The conductive members 51 are placed on the outer sides of the inner insulating cover 55, and the first crimp portion 61b of each auxiliary terminal 61 is inserted in the insertion hole 52a of the associated conductive member 51. After the insertion, the first crimp portion 61b of each auxiliary terminal 61 is crimped to secure the auxiliary terminal 61 to the lid member 15. At this time, the crimping of the first crimp portion 61b secures each conductive member 51 to the inner surface of the lid member 15 while the conductive member 51 is insulated from the lid member 15 by the inner insulating cover 55. Each outer insulating member 57 insulates the associated auxiliary terminal 61 from the lid member 15.

Next, each rotation prevention portion 15a is covered with the associated terminal insulator 59, and the rotation prevention portion 15a is placed on the inner side of the base 66a of the associated external terminal 66. Subsequently, the second crimp portion 61c of each auxiliary terminal 61 is inserted in the crimp portion insertion hole 54a of the associated connecting conductor 54, and the post 66b of each external terminal 66 is inserted in the post insertion hole 54b of the associated connecting conductor 54.

As shown in FIG. 6A, the crimping of the second crimp portions 61c connects each auxiliary terminal 61 to the associated external terminal 66 via the connecting conductor 54. At this time, each external terminal 66 is insulated from the lid member 15 by the associated terminal insulator 59 and is prevented from rotating by the associated rotation prevention portion 15a.

As shown in FIG. 6B, with the conductive members 51, the auxiliary terminals 61, and the external terminals 66 secured to the lid member 15, the connecting pieces 53 protrude from the fixed pieces 52 in a direction orthogonal to the inner surface of the lid member 15. In this manner, the inner insulating cover 55, the conductive members 51, the connecting conductors 54, the terminal insulators 59, the auxiliary terminals 61, and the external terminals 66 are mounted on the lid member 15 to form a lid terminal assembly 18. In the lid terminal assembly 18, the first surface 52b of the fixed piece 52 of each conductive member 51 is opposed to the inner surface of the lid member 15. The connecting pieces 53 protrude from the inner surface of the lid member 15 in a direction orthogonal to the inner surface.

Figure 7:
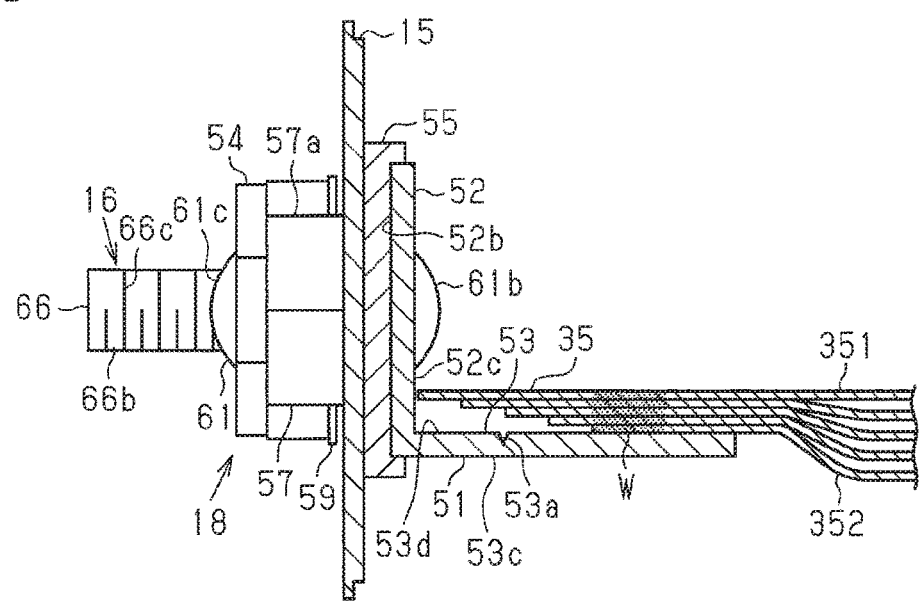
FIG. 7 is a partial cross-sectional view of the tabs welded to the connecting piece.

Next, as shown in FIG. 7, the lid terminal assembly 18 and the electrode assembly 12 are integrated by joining the conductive member 51 of each polarity to the associated tabs 25, 35. The tabs 25, 35 are mounted on the inner surface 53d of the connecting piece 53 of the associated conductive member 51 between the groove 53a and the distal end of the connecting piece 53. With the second tab 352 in contact with the inner surface 53d of the connecting piece 53, the tabs 25, 35 are welded to the connecting piece 53 to form the conduction part W, which electrically connects all the tabs 25, 35 and the connecting piece 53. At this time, the distal end of each tab 25, 35 extends over the groove 53a and is located in the vicinity of the fixed piece 52.

Figure 8:
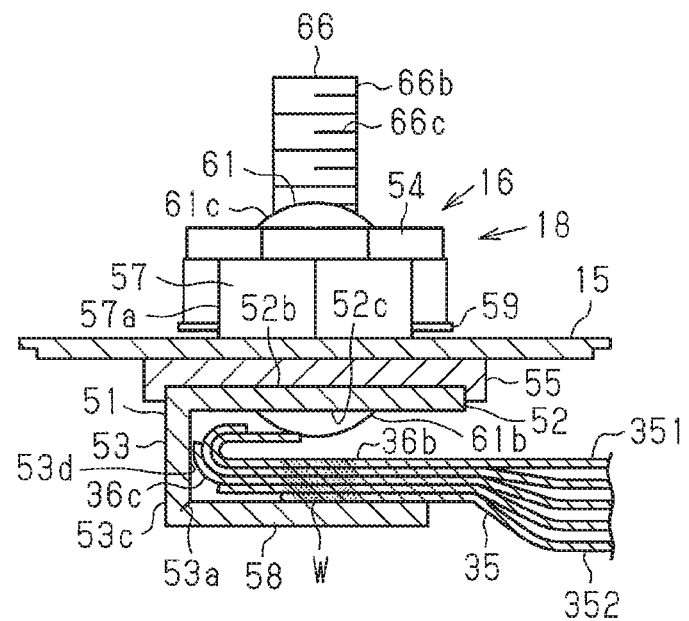
FIG. 8 is a partial cross-sectional view of the tabs in a folded state.

Next, as shown in FIG. 8, the connecting piece 53 of each conductive member 51 is folded at the groove 53a to form a valley fold. At this time, the connecting piece 53 approaches, together with the tabs 25, 35, the second surface 52c of the fixed piece 52, which is mounted on the lid member 15. When the connecting piece 53 is folded, parts of all the tabs 25, 35 closer to the distal end than the conduction part W are covered with the connecting piece 53 from the side facing the electrode assembly 12. Simultaneously, parts of all the tabs 25, 35 of each polarity closer to the distal end than the conduction part W are folded to form the second bent portion 36c, and the extended portion 36b covered with the folded portion 58 is formed. At this time, parts of the extended portion 36b closer to the distal end than the conduction part W is covered with the folded portion 58.

Subsequently, the proximal ends of all the tabs 25, 35 of each polarity are folded to form the first bent portion 36a so that the extended portion 36b is formed between the first bent portion 36a and the second bent portion 36c. At this time, the extended portion 36b including the portion closer to the distal end than the conduction part W is covered with the folded portion 58 from the side facing the electrode assembly 12. Subsequently, the electrode assembly 12 is inserted into the case member 14, and the lid member 15 is joined to the opening end of the electrode assembly 12. In this manner, the case 11 is formed, and the rechargeable battery 10 is formed.

The first embodiment has the following advantages.

(1) In a state in which the conductive members 51 are mounted on the lid member 15 via the fixed pieces 52 to form the lid terminal assembly 18, the connecting pieces 53 protrude from the fixed pieces 52. By joining the tabs 25, 35 of each polarity to the associated connecting piece 53 of the lid terminal assembly 18, the lid member 15 and the electrode assembly 12 are integrated via the tabs 25, 35. As a result, for example, unlike the case in which the conductive members 51 are secured to the lid member 15 after the conduction parts W are formed by joining the conductive members 51 to the tabs 25, 35, the conductive members 51 are unlikely to move with the tabs 25, 35 serving as the starting points. Thus, the conductive members 51 are stably held, and the load applied to the tabs 25, 35 is reduced.

(2) Each conductive member 51 includes the fixed piece 52, which is mounted on the lid member 15, and the connecting piece 53, which protrudes from the fixed piece 52. The folded portion 58, which is part of the connecting piece 53, covers part of the tab bundle 36 closer to the distal end than the conduction part W from the side facing the electrode assembly 12. Thus, even if the section of the tab bundle 36 closer to the distal end than the conduction part W is a free end, or even if the tabs 25, 35 are displaced in the arrangement direction X, the tabs 25, 35 are prevented from contacting the case 11 and the electrode assembly 12.

(3) Each conductive member 51 includes the fixed piece 52, which is mounted on the lid member 15, and the connecting piece 53, which protrudes from the fixed piece 52. The folded portion 58, which is part of the connecting piece 53, is formed by folding part of the connecting piece 53 closer to the distal end at the groove 53a. In manufacturing of the rechargeable battery 10, the tabs 25, 35 of each polarity are welded to part of the associated connecting piece 53 closer to the distal end than the groove 53a. Thus, when the connecting piece 53 is folded at the groove 53a, the extended portion 36b is covered with the folded portion 58 while the tabs 25, 35 are folded at the second bent portion 36c. Thus, at the same time as folding the connecting piece 53, the tabs 25, 35 are covered with the folded portion 58. Thus, folding and protecting of the tabs 25, 35 are simultaneously performed. This reduces the time required for manufacturing the rechargeable battery 10.

(4) Each conductive member 51 includes the fixed piece 52, which is mounted on the lid member 15, and the connecting piece 53, which protrudes from the fixed piece 52. Each auxiliary terminal 61 is connected to the first end in the longitudinal direction of the associated fixed piece 52. Each conductive member 51 also includes the connecting piece 53 on the second end in the longitudinal direction of the fixed piece 52. Thus, the auxiliary terminal 61, which includes a section located inside the rechargeable battery 10, and the tab bundle 36 are arranged in the arrangement direction X. Thus, the rechargeable battery 10 is reduced in size in the opposing direction Z compared with, for example, a case in which the auxiliary terminal 61 and the tab bundle 36 are overlapped in the opposing direction Z.

(5) Each conductive member 51 is mounted on the lid member 15 by crimping the associated auxiliary terminal 61. The crimping of the auxiliary terminals 61 is performed before the electrode assembly 12 is welded to the conductive members 51. Thus, the electrode assembly 12 is prevented from being damaged by the impact caused when the auxiliary terminals 61 are crimped.

(6) Each conductive member 51 includes the groove 53a, which assists in folding the connecting piece 53. Thus, the groove 53a facilitates folding the connecting piece 53, and also the tabs 25, 35.

(7) The pair of connecting pieces 53 are arranged next to each other on the lid terminal assembly 18 with the outer surfaces 53c being flush with each other and the inner surfaces 53d being flush with each other. In the electrode assembly 12, the positive and negative tabs 25, 35 are also flush with each other. Thus, the tabs 25, 35 and the connecting pieces 53 are joined without the tabs 25, 35 being twisted.

(8) The conductive members 51 are formed into a U-shape as viewed from the arrangement direction X. The distal end of each tab bundle 36 is joined to the inner surface 53d of the associated connecting piece 53. Thus, compared with a case in which the distal end of each tab bundle 36 is joined to the outer surface 53c of the associated connecting piece 53, a dead space formed by the thickness of the distal end sections of the tab bundles 36 is reduced in the space between the connecting pieces 53 and the tab-side end face 12b. In addition, compared with the case in which the distal end section of each tab bundle 36 is joined to the outer surface 53c of the associated connecting piece 53, the connecting pieces 53 are brought close to the tab-side end face 12b in the opposing direction Z. Thus, the size of the electrode assembly 12 can be increased.

Second Embodiment

Next, a method for manufacturing an electricity storage device according to a second embodiment will be described with reference to FIGS. 9 to 14. The method is applied to the manufacture of a rechargeable battery. The detailed description of the configuration of the second embodiment that is the same as the first embodiment will be omitted.

Figure 9:
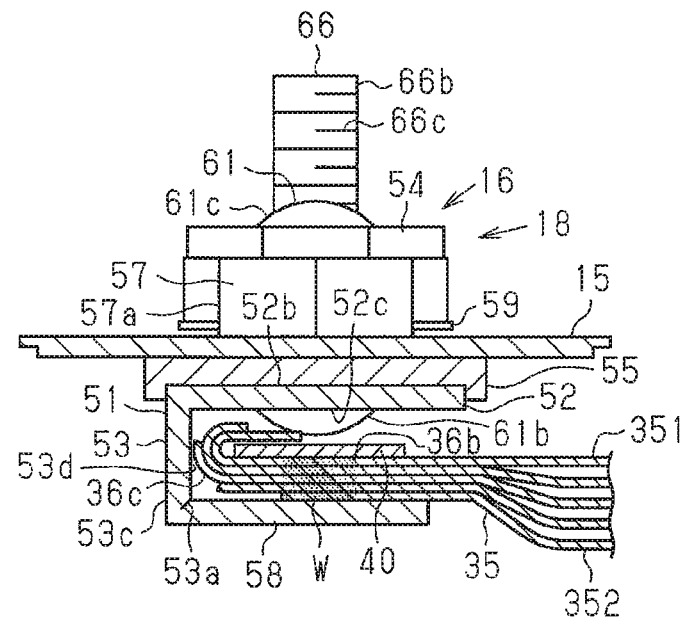
FIG. 9 is a partial cross-sectional view illustrating a welding method using a protective plate according to a second embodiment of the present invention.

The joining structure of the positive tabs 25 and the associated conductive member 51, and the joining structure of the negative tabs 35 and the associated conductive member 51 will be described with reference to FIG. 9. FIG. 9 illustrates the joining structure of the negative tabs 35 and the associated conductive member 51. The joining structure is the same as the joining structure of the positive tabs 25 and the associated conductive member 51. Thus, the description of the joining structure of the positive tabs 25 and the associated conductive member 51 is omitted. The following description applies to the joining structure of the positive tabs 25 and the positive conductive member 51 by replacing the term "negative" with "positive".

As shown in FIG. 9, the negative tabs 35 and the associated connecting piece 53 are joined to each other using a protective plate 40. When the tabs 35 and the associated connecting piece 53 are joined by resistance welding, the protective plate 40 protects the tabs 35, and in particular, the first tab 351 from a welding electrode. The protective plate 40 has a rectangular plate-like shape and is joined to the first tab 351.

A welding device 41 for joining the tabs 25, 35 of each polarity and the connecting piece 53 of the associated conductive member 51 will now be described. The welding device 41 is a device for resistance welding, or more specifically, spot welding the connecting piece 53 of each conductive member 51 with the associated tabs 25, 35.

Figure 10:
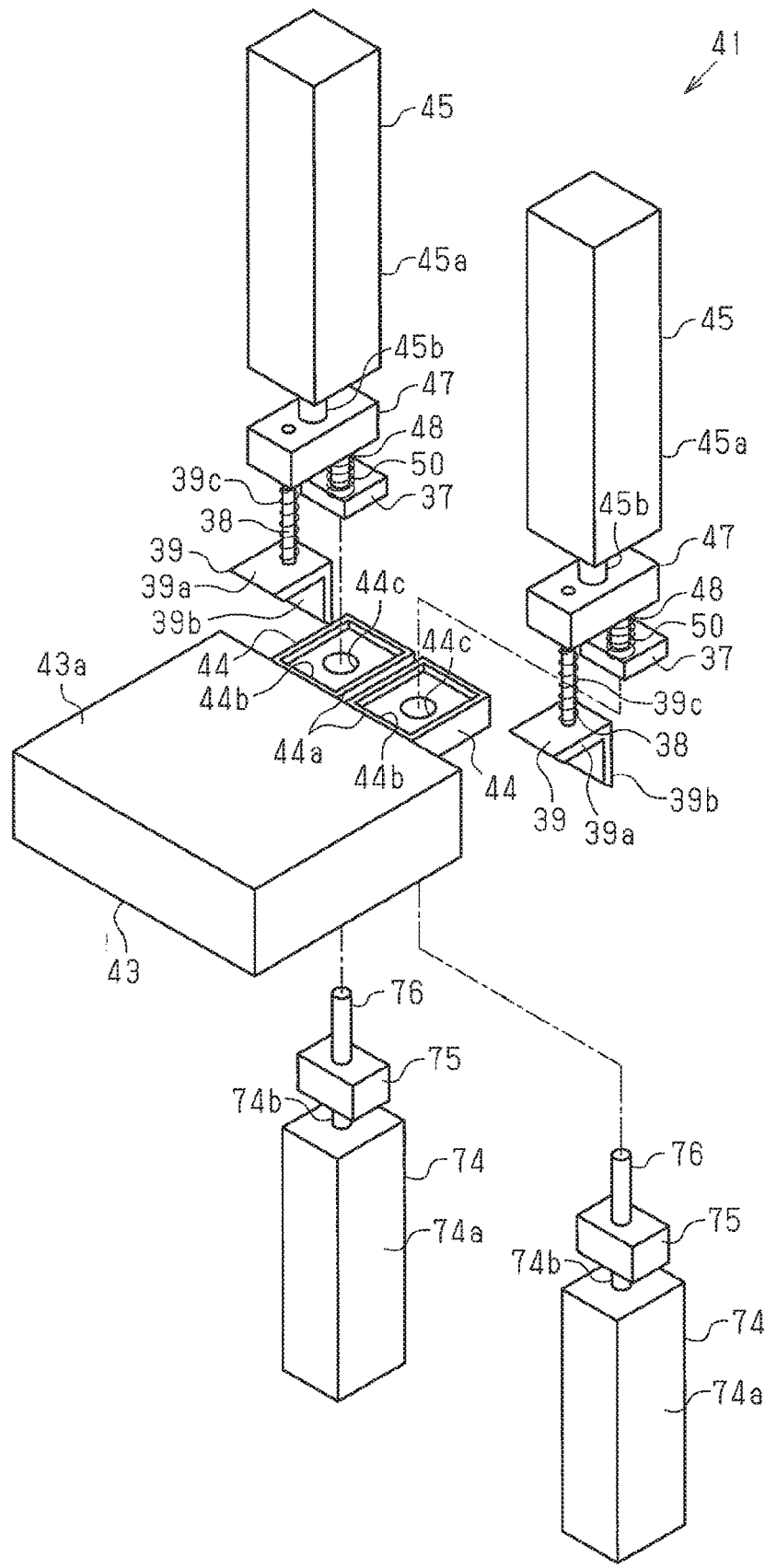
FIG. 10 is a schematic perspective view of a welding device.
Figure 11:
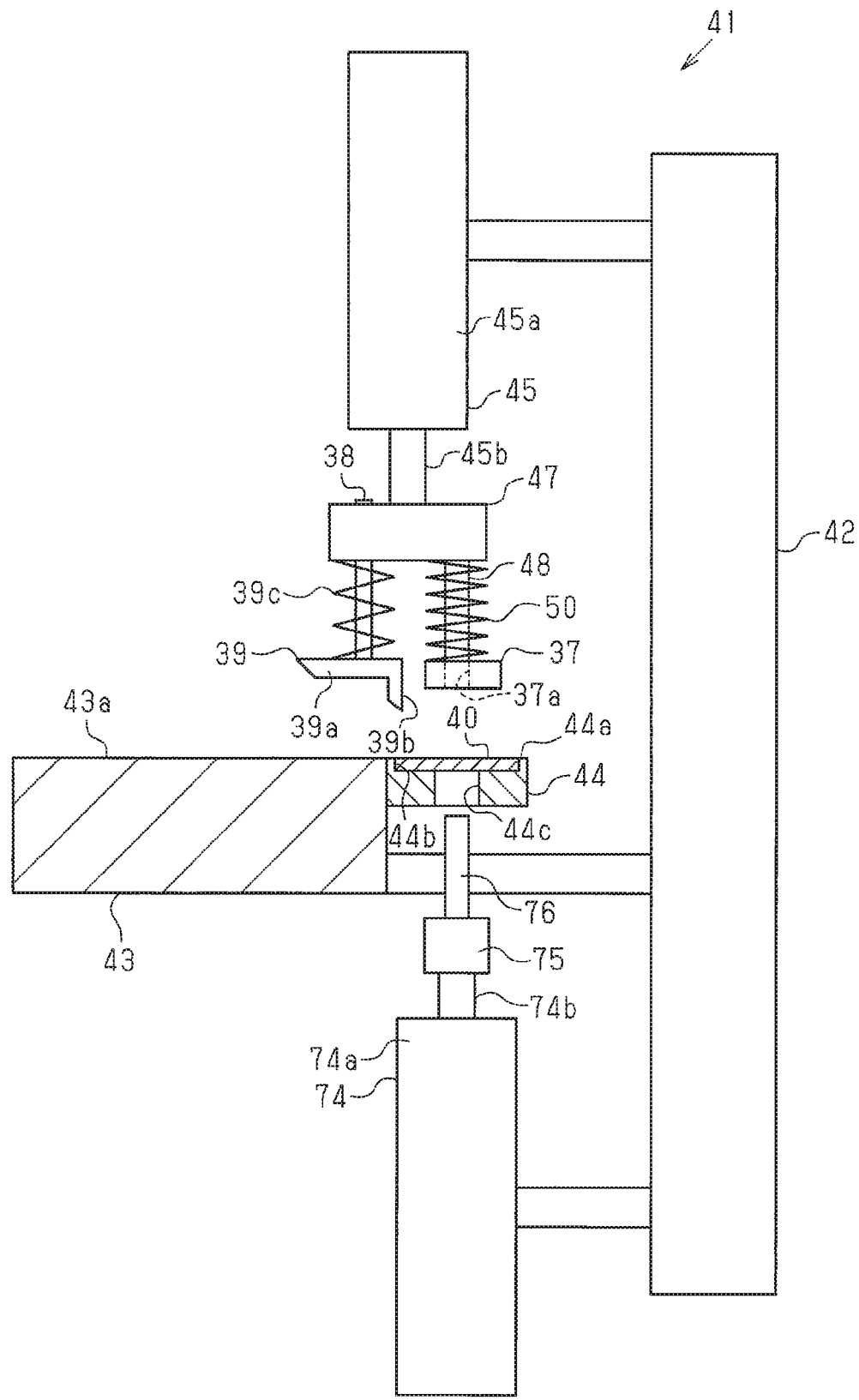
FIG. 11 is a schematic side view of the welding device.

As shown in FIGS. 10 and 11, the welding device 41 includes a support column 42 and a mounting base 43, which is supported by the support column 42. The upper surface of the mounting base 43 is a mounting surface 43a, on which the electrode assembly 12 is set. The mounting surface 43a is a flat surface and is rectangular in a plan view. The welding device 41 includes a pair of protective plate mounting portions 44. The protective plate mounting portions 44 are integrated with the mounting base 43. The pair of protective plate mounting portions 44 are arranged with a gap in between. The gap between the protective plate mounting portions 44 extends along the long sides of the mounting surface 43a. The positive tabs 25 are mounted on one of the protective plate mounting portions 44, and the negative tabs 35 are placed on the other one of the protective plate mounting portions 44. The protective plate mounting portions 44 are formed of insulating material.

The protective plate mounting portions 44 each include an upper surface 44a, which is flush with the mounting surface 43a, and a protective plate accommodating portion 44b, which is recessed from the upper surface 44a. The shape of the protective plate accommodating portion 44b is rectangular in a plan view and is substantially the same as the shape of the protective plate 40 in a plan view. The protective plate 40 is accommodated in each protective plate accommodating portion 44b.

The shortest distance from the upper surface 44a of each protective plate mounting portion 44 to the inner bottom surface of the protective plate accommodating portion 44b is defined as the depth of the protective plate accommodating portion 44b. The depth of the protective plate accommodating portion 44b is the same as the thickness of the protective plate 40. Thus, when the protective plate 40 is accommodated in each protective plate accommodating portion 44b so that the protective plate 40 is placed on the inner bottom surface of the protective plate accommodating portion 44b, the surface of the protective plate 40 is flush with the upper surface 44a of the protective plate mounting portion 44. Each protective plate mounting portion 44 includes an electrode insertion hole 44c, which extends through the bottom portion of the protective plate accommodating portion 44b.

The welding device 41 includes a pair of first actuators 45, which are secured to the support column 42. The first actuators 45 are air cylinders. Each first actuator 45 includes a body 45a, a non-illustrated piston, which is movable in the body 45a, and a rod 45b, which is integrated with the piston. Each first actuator 45 also includes a non-illustrated pair of supply and discharge ports. The piston moves in the body 45a by supplying air to the pair of supply and discharge ports and discharging air from the supply and discharge ports. The movement of the piston causes the rod 45b to protrude from and retract into the body 45a.

The welding device 41 includes mounting heads 47 each mounted on the distal end of the rod 45b of the associated first actuator 45. The mounting heads 47 have a rectangular plate-like shape. The welding device 41 includes columnar first welding electrodes 48. Each first welding electrode 48 is mounted on the first end in the longitudinal direction of the associated mounting head 47. Each first welding electrode 48 is located above the protective plate accommodating portion 44b of the associated protective plate mounting portion 44. Each first welding electrode 48 is located in a state in which the distal end of the first welding electrode 48 faces the associated protective plate mounting portion 44.

The welding device 41 includes electrode springs 50. Each electrode spring 50 is integrated with the first end of the associated mounting head 47. The electrode spring 50 is integrated with the mounting head 47 in a state in which the electrode spring 50 surrounds the associated first welding electrode 48. The electrode springs 50 are coil springs. The upper end of each electrode spring 50 is secured to the mounting head 47, and the lower end of each electrode spring 50 is secured to a depression part 37. The depression part 37 is formed of insulating material and shaped like a plate. The depression part 37 includes a through hole 37a, which is surrounded by the circumference of the lower end of the electrode spring 50. The first welding electrode 48 is insertable into the through hole 37a.

The welding device 41 includes support rods 38. Each support rod 38 is mounted on the second end in the longitudinal direction of the associated mounting head 47. The support rod 38 is movable in the thickness direction of the mounting head 47. The welding device 41 includes foil collecting parts 39. Each foil collecting part 39 is mounted on the distal end of the associated support rod 38. The foil collecting parts 39 are formed of insulating material. Each foil collecting part 39 has an inverted L-like shape in side view as viewed from one of the long sides of the mounting head 47.

Each foil collecting part 39 includes a rectangular plate-like base portion 39a and a tab depression portion 39b. The rectangular plate-like base portion 39a is connected to the distal end of the associated support rod 38. The tab depression portion 39b is integrated with the edge of the base portion 39a close to the first welding electrode 48. The direction in which the tab depression portion 39b protrudes from the base portion 39a is defined as a protruding direction. The distal end in the protruding direction of the tab depression portion 39b is closer to the associated protective plate mounting portion 44 than the lower surface of the depression part 37.

The welding device 41 includes tab-side springs 39c. Each tab-side spring 39c is integrated with the second end of the associated mounting head 47. Each tab-side spring 39c is integrated with the associated mounting head 47 in a state in which the tab-side spring 39c surrounds the associated support rod 38. The tab-side springs 39c are coil springs. The upper end of each tab-side spring 39c is secured to the associated mounting head 47, and the lower end of each tab-side spring 39c is secured to the base portion 39a of the associated foil collecting part 39.

The welding device 41 includes a pair of second actuators 74, which are secured to the support column 42. The pair of second actuators 74 are each located at a position opposing the corresponding first actuator 45. The second actuators 74 are air cylinders. Each second actuator 74 includes a body 74a, a non-illustrated piston, which is movable in the body 74a, and a rod 74b, which is integrated with the piston. Each second actuator 74 also includes a non-illustrated pair of supply and discharge ports. The piston moves in the body 74a by supplying air to the pair of supply and discharge ports and discharging air from the supply and discharge ports. The movement of the piston causes the rod 74b to protrude from and retract into the body 74a.

The welding device 41 includes mounting heads 75 each mounted on the distal end of the rod 74b of the associated second actuator 74. The mounting heads 75 have a rectangular plate-like shape. The welding device 41 includes columnar second welding electrodes 76 each mounted on the associated mounting head 75. Each second welding electrode 76 is located below the electrode insertion hole 44c of the associated protective plate mounting portion 44. Each second welding electrode 76 is located in a state in which the distal end of the second welding electrode 76 faces the associated electrode insertion hole 44c. Each second welding electrode 76 is insertable into the electrode insertion hole 44c of the associated protective plate mounting portion 44.

A method for manufacturing the rechargeable battery 10 using the welding device 41 will now be described. The lid terminal assembly 18 is assumed to be previously assembled.

First, as shown in FIG. 11, each rod 45b is retracted into the associated body 45a by the first actuator 45, and each mounting head 47 is separated from the associated protective plate mounting portion 44. Similarly, each rod 74b is retracted into the associated body 74a by the second actuator 74, and each mounting head 75 is separated from the associated protective plate mounting portion 44. The protective plates 40 are set on the protective plate accommodating portions 44b of the protective plate mounting portions 44.

Figure 12:
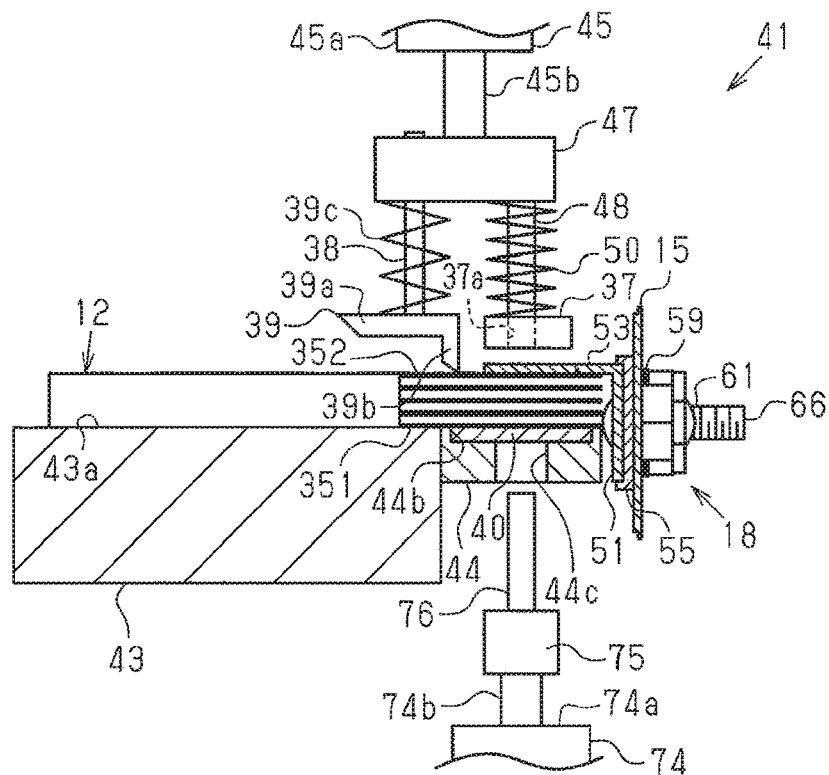
FIG. 12 is a schematic side view of the welding device on which the electrode assembly is placed.

Next, as shown in FIG. 12, the electrode assembly 12 is mounted on the mounting surface 43a of the mounting base 43, and the tabs 25, 35 of each polarity are mounted on the associated protective plate 40.

Subsequently, the connecting pieces 53 of the conductive members 51 of the lid terminal assembly 18 are mounted on the second tabs 352 of the tabs 25, 35 so that the inner surfaces 53d of the connecting pieces 53 contact the second tabs 352. Each first actuator 45 causes the rod 45b to project from the body 45a and the mounting head 47 to approach the associated protective plate mounting portion 44. The distal end of the tab depression portion 39b of the foil collecting part 39 is brought into contact with the second tab 352 to depress the tabs 25, 35.

Figure 13:
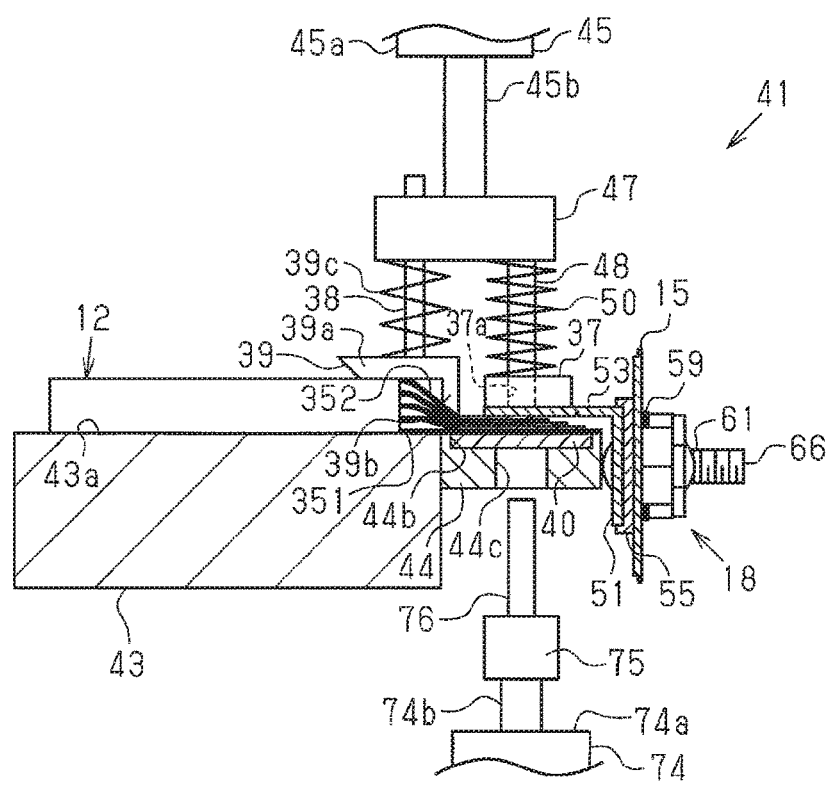
FIG. 13 is a schematic side view illustrating a state in which the tabs are collected.

As shown in FIG. 13, the tabs 25, 35 are collected at the lower end of the electrode assembly 12, that is, the first end in the stacking direction L of the electrode assembly 12. After that, when the base portions 39a contact the upper end face of the electrode assembly 12, that is, the second end in the stacking direction L of the electrode assembly 12, depression of the tabs 25, 35 by the tab depression portions 39b is stopped.

Subsequently, depression of the connecting pieces 53 by the depression parts 37 is started. This presses the connecting pieces 53 against the tabs 25, 35. The tabs 25, 35 and the connecting pieces 53 are sandwiched between the upper surfaces 44a of the protective plate mounting portions 44 and the depression parts 37. At this time, each first welding electrode 48 passes through the through hole 37a of the associated depression part 37 and contacts the outer surface 53c of the associated connecting piece 53.

Figure 14:
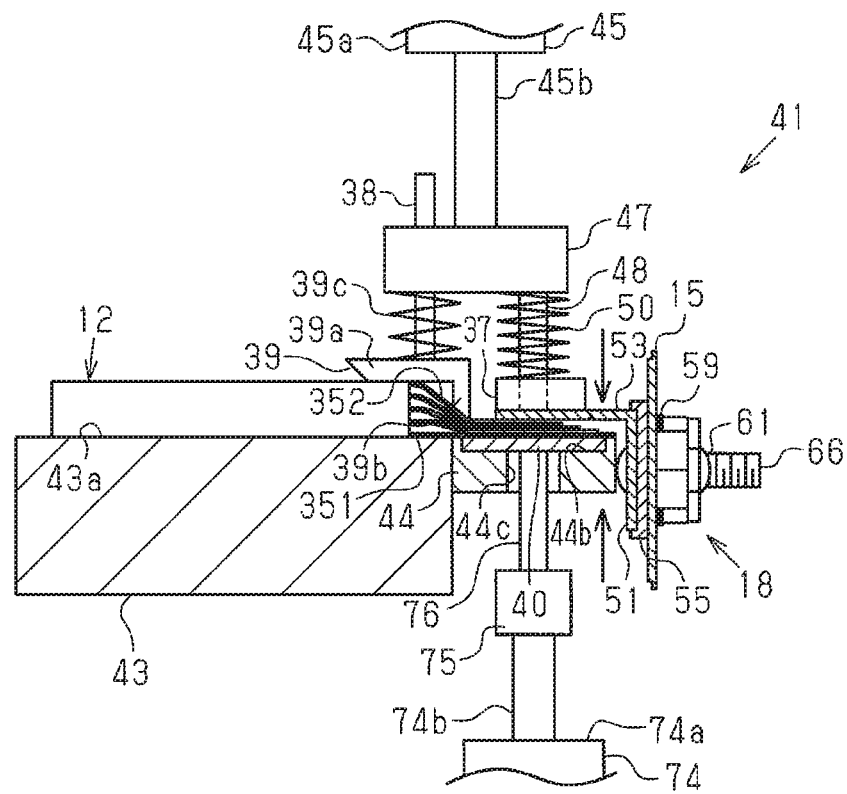
FIG. 14 is a schematic side view illustrating a state in which resistance welding is performed by pressing the connecting piece against the tabs.

Next, as shown in FIG. 14, each second actuator 74 causes the rod 74b to project from the body 74a and the mounting head 75 to approach the associated protective plate mounting portion 44. Each second welding electrode 76 is inserted in the electrode insertion hole 44c of the associated protective plate mounting portion 44, and the distal end of each second welding electrode 76 is brought into contact with the associated protective plate 40. Thus, each first welding electrode 48 and the associated second welding electrode 76 sandwich the tabs 25, 35 and the associated connecting piece 53. Each connecting piece 53 and the associated tabs 25, 35 are welded by supplying electricity through each first welding electrode 48 and the associated second welding electrode 76.

As a result, the conduction part W, which electrically connects each connecting piece 53 to all the associated tabs 25, 35, is formed, and the lid terminal assembly 18 and the electrode assembly 12 are integrated. Subsequently, the rechargeable battery 10 is manufactured in the same manner as in the first embodiment.

In addition to the advantages of the first embodiment, the second embodiment achieves the following advantage.

(9) The tabs 25, 35 and the connecting pieces 53 are joined by resistance welding using the welding device 41. The welding device 41 is capable of simultaneously activating the pair of first welding electrodes 48 and is capable of simultaneously activating the pair of second welding electrodes 76. The pair of conductive members 51 are integrated with the lid terminal assembly 18. Thus, both the pair of connecting pieces 53 of the lid terminal assembly 18 and the tabs 25, 35 of the electrode assembly 12 are simultaneously joined using the welding device 41. Thus, compared with the case in which the connecting pieces 53 of the conductive members 51 are separately joined to the tabs 25, 35, the time required for manufacturing the rechargeable battery 10 is reduced.

The above illustrated embodiments may be modified as follows.

Figure 15:
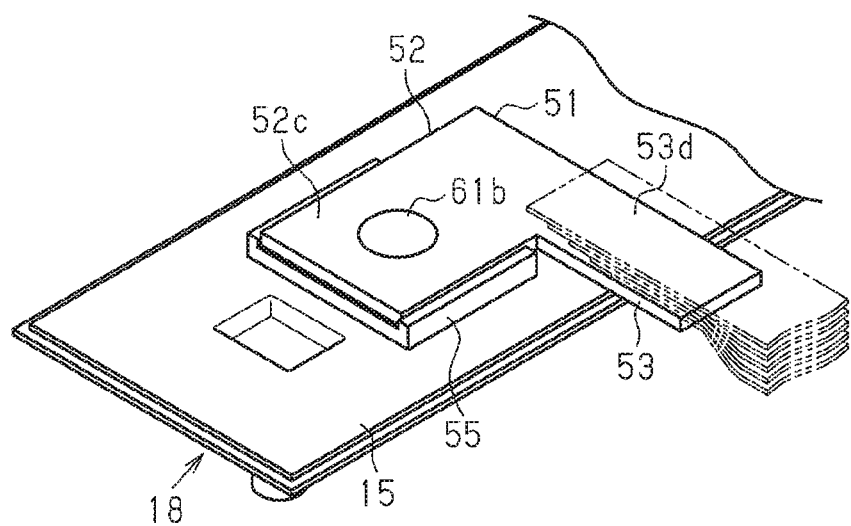
FIG. 15 is a perspective view of a conductive member according to a modification illustrating a state in which the tabs are welded to the conductive member.

As shown in FIG. 15, the connecting piece 53 of each conductive member 51 before being welded to the tab bundle 36 does not necessarily have to be bent with respect to the fixed piece 52. In this case, the first surface 52b of the fixed piece 52 may be flush with the outer surface 53c of the connecting piece 53, and the second surface 52c of the fixed piece 52 may be flush with the inner surface 53d of the connecting piece 53. In this case, the connecting piece 53 may be bent with respect to the fixed piece 52 before or after securing each conductive member 51 to the lid member 15, or after the tabs 25, 35 are welded to the connecting piece 53. The connecting piece 53 is preferably bent with respect to the fixed piece 52 before securing each conductive member 51 to the lid member 15 since the mounting operation is easy in that way.

In the connecting structure of each conductive member 51 and the electrode terminal, the auxiliary terminal 61, the external terminal 66, and the connecting conductor 54 may be omitted.

Figure 16:
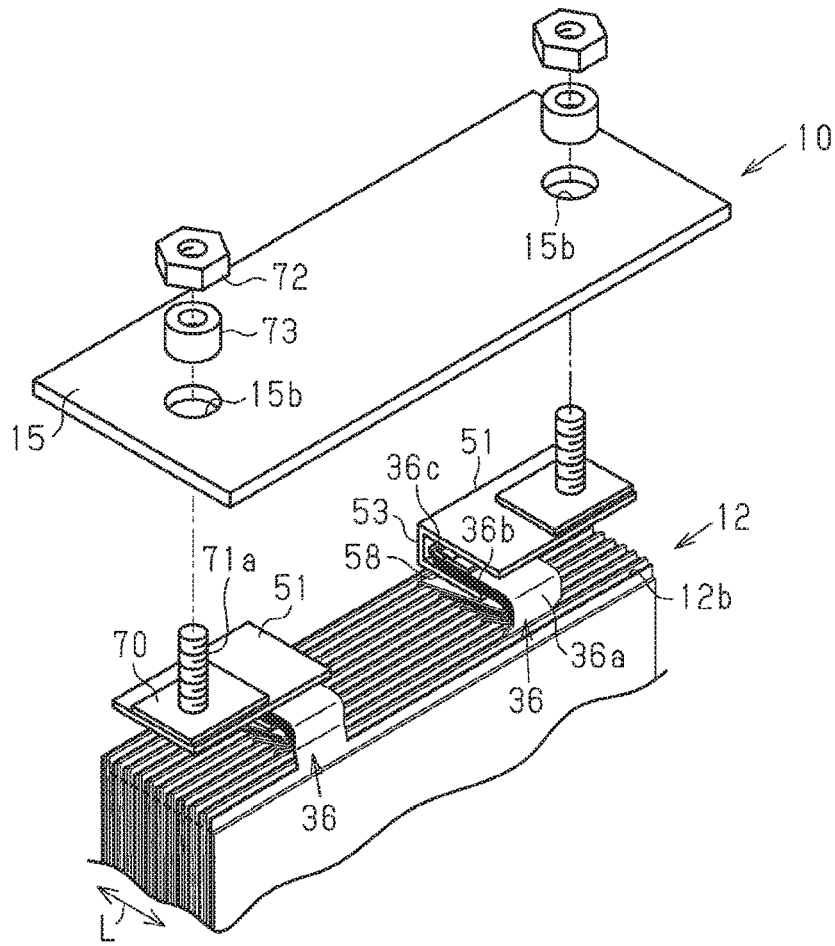
FIG. 16 is a partial perspective view of the electrode terminals and the conductive members according to a modification.

For example, as shown in FIG. 16, an electrode terminal 70 may be directly connected to each conductive member 51. In this case, after joining the electrode terminal 70 to the conductive member 51, the electrode terminal 70 is inserted in the associated terminal insertion hole 15b of the lid member 15. A nut 72 is screwed to an external thread 71a of each electrode terminal 70, which protrudes from the lid member 15, so that the electrode terminal 70 is secured to the lid member 15 to form the lid terminal assembly 18. In this case, each conductive member 51 is joined to the associated electrode terminal 70, and the electrode terminal 70 is secured to the lid member 15. That is, each conductive member 51 is mounted on the lid member 15 via the associated electrode terminal 70.

Subsequently, the tabs 25, 35 are welded to the connecting pieces 53 of the conductive members 51, which protrude from the lid member 15. The folded portion 58 is formed by bending the distal end section of each connecting piece 53, and the folded portion 58 covers the associated extended portion 36b. An insulating ring 73 is located between the inner circumferential surface of each terminal insertion hole 15b and the outer circumferential surface of the associated external thread 71a. Each insulating ring 73 insulates between the lid member 15 and the associated electrode terminal 70.

Figure 17:
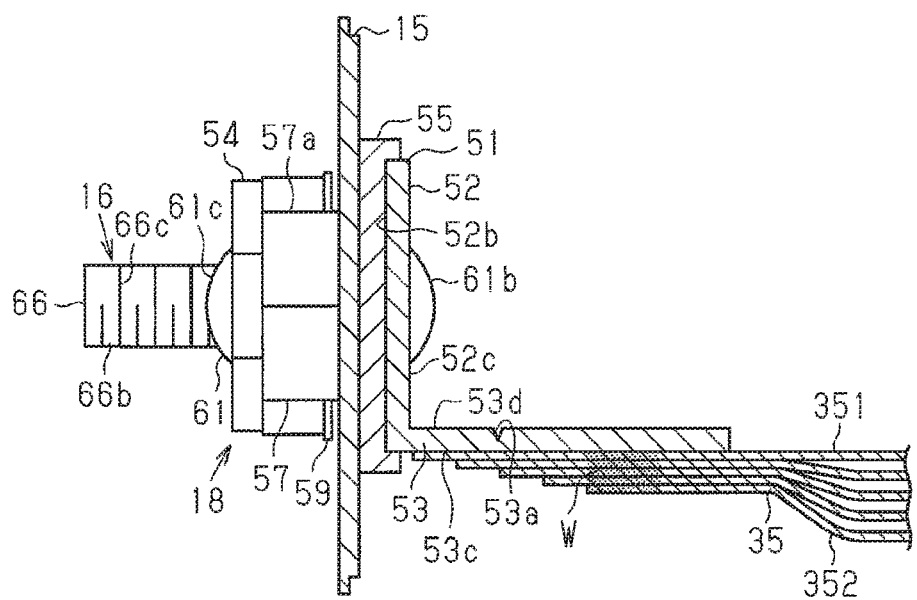
FIG. 17 is a partial cross-sectional view of the tabs and the connecting piece welded according to a modification.

As shown in FIG. 17, the tabs 25, 35 may be joined to the outer surface 53c of each connecting piece 53. In this case, as shown in FIG. 17, the first tab 351 may be brought into contact with the outer surface 53c of the connecting piece 53 to join the tabs 25, 35. Although not shown, the second tab 352 may be brought into contact with the outer surface 53c of the connecting piece 53 to join the tabs 25, 35.

In each of the above-described embodiments, the second tab 352 is brought into contact with the inner surface 53d of the connecting piece 53 to join the tabs 25, 35 to the connecting piece 53. However, the structure is not limited to this. The first tab 351 may be brought into contact with the inner surface 53d of the connecting piece 53 to join the tabs 25, 35 to the connecting piece 53.

Figure 18:
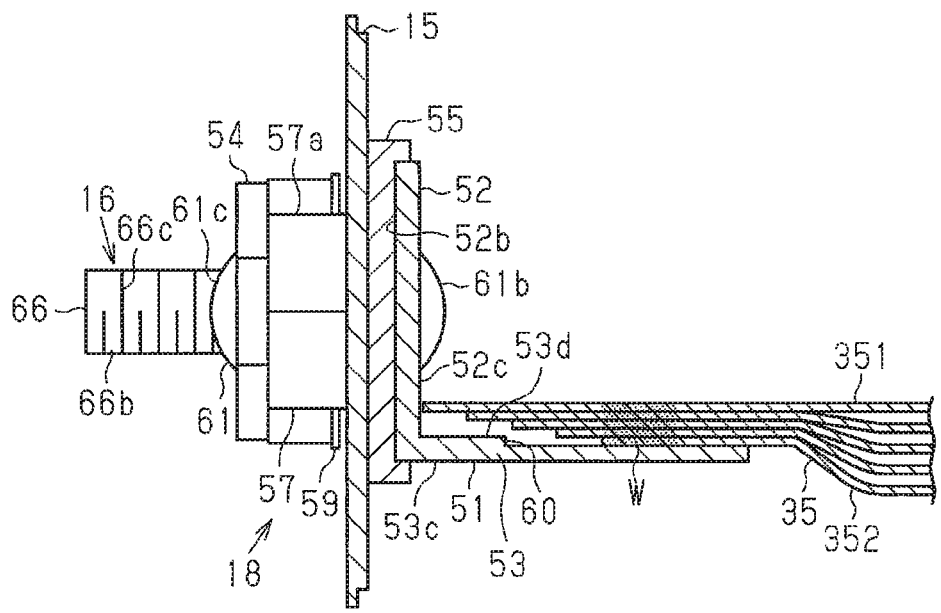
FIG. 18 is a partial cross-sectional view of a conductive member according to a modification.
Figure 19:
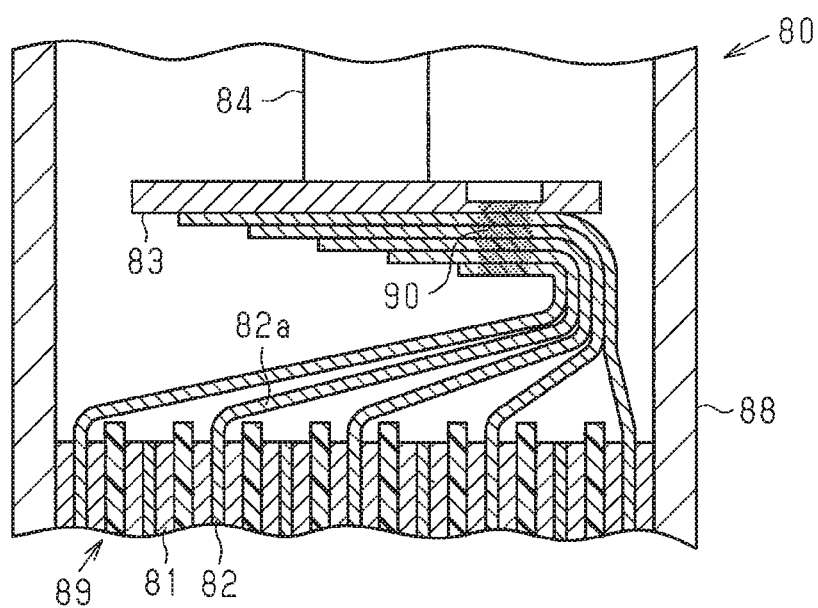
FIG. 19 is a diagram illustrating a conventional art.

As shown in FIG. 18, the thickness of each connecting piece 53 may be changed along the direction in which the connecting piece 53 protrudes toward the electrode assembly 12. In this case, each connecting piece 53 has a thick portion at the proximal end in the vicinity of the fixed piece 52 and a thin portion between the distal end in the vicinity of the electrode assembly 12 and the thick portion. The connecting piece 53 includes a step 60 at a boundary between the thick portion and the thin portion. The step 60 serves as a portion of the connecting piece 53 that is bent to cover the distal end section of the tab bundle 36 from the side facing the electrode assembly 12. In this case, the folded portion 58 is easily folded using the change in the thickness of the connecting piece 53.

In each of the above-described embodiments, each conductive member 51 is U-shaped as viewed from the arrangement direction X since the fixed piece 52 overlaps with the distal end section of the connecting piece 53 as viewed from the lid member 15. However, the shape of each conductive member 51 is not limited to this shape. For example, the conductive member 51 may protrude diagonally such that part of the proximal end of the folded portion 58 overlaps with the fixed piece 52, and the distal end of the folded portion 58 does not overlap with the fixed piece 52 as viewed from the lid member 15 although the conductive member 51 is U-shaped as viewed from the arrangement direction X.

In each of the above-described embodiments, the folded portion 58 of each connecting piece 53 is parallel to the associated fixed piece 52, and the outer surface 53c and the inner surface 53d of the folded portion 58 are orthogonal to the outer surface 53c and the inner surface 53d of the connecting piece 53. However, the structure is not limited to this. The outer surface 53c and the inner surface 53d of the folded portion 58 may intersect the outer surface 53c and the inner surface 53d of the connecting piece 53 at an angle other than a right angle.

The groove 53a at which the folded portion 58 is folded may be omitted from each connecting piece 53.

If the lid member 15 is formed of insulating material, the fixed piece 52 of each conductive member 51 may be directly secured to the lid member 15. In this case, the inner insulating cover 55 is unnecessary.

In the plan view of the lid member 15, the fixed pieces 52 do not necessarily have to be located at positions opposed to the positive terminal 16 and the negative terminal 17.

In each of the above-described embodiments, the fixed piece 52 of each conductive member 51 has a rectangular shape extending in the arrangement direction X, and the connecting piece 53 extends from the second end in the longitudinal direction of the fixed piece 52. However, the structure is not limited to this. The shape of the fixed piece 52 and the position of the connecting piece 53 on the fixed piece 52 may be modified as required. For example, the fixed piece 52 may be square, and the connecting piece 53 may be located on one side of the fixed piece 52. In this case, each tab bundle overlaps with the electrode terminal in the opposing direction Z.

The electrode assembly may be a spiral-type electrode assembly, in which a band-like positive electrode and a band-like negative electrode are wound about a winding axis while being insulated from each other. In this case, the positive electrode includes a positive uncoated portion, on which a positive active material is not applied, along one of the long sides of a positive metal foil. The positive electrode includes tabs, which protrude from part of one side. The tabs are arranged at intervals in the longitudinal direction of the positive electrode. The negative electrode includes a negative uncoated portion, on which negative active material is not applied, along one of the long sides of a negative metal foil. The negative electrode includes tabs, which protrude from part of one side. The tabs are arranged at intervals in the longitudinal direction of the negative electrode.

In the spiral-type electrode assembly, the positive electrode and the negative electrode are wound while being insulated from each other such that the tabs having the same polarity overlap with each other. Thus, on one end in the axial direction of the electrode assembly, positive tabs are stacked in the stacking direction of the electrode assembly, and negative tabs are stacked in the stacking direction of the electrode assembly. The tab bundle of each polarity includes a bent portion and an extended portion. The bent portion is stacked at the first end in the stacking direction of the electrode assembly and is curved toward the second end. The extended portion protrudes from the bent portion in the stacking direction of the electrode assembly.

In each of the above-described embodiments, each tab bundle 36 includes the first bent portion 36a, the extended portion 36b, and the second bent portion 36c. However, the tab bundle 36 may be bent once or more than two times.

The first actuators 45 and the second actuators 74 do not necessarily have to be hydrostatic cylinders, which are air cylinders in the above-described embodiment, but may be, for example, hydraulic cylinders.

The first actuators 45 and the second actuators 74 are air cylinders in the above-described embodiment. However, the first actuators 45 and the second actuators 74 are not limited to the air cylinders. As long as the depression parts 37, the foil collecting parts 39, and the welding electrodes 48, 76 can be moved in the stacking direction of the tabs 25, 35, the first actuators 45 and the second actuators 74 may be changed to, for example, electric cylinders, link mechanisms, or cam mechanisms.

Each positive electrode 21 may include the positive active material layer 23 on one side. Similarly, each negative electrode 31 may include the negative active material layer 33 on one side.

Each separator 24 may be a pouch that accommodates the positive electrode 21 or the negative electrode 31.

The wall to which the positive terminal 16 and the negative terminal 17 are secured may be one of the side walls or the bottom wall of the case member 14 of the case 11.

The rechargeable battery 10 is not limited to a lithium-ion rechargeable battery, but may be other rechargeable batteries such as a nickel-hydrogen rechargeable battery or a nickel-cadmium rechargeable battery.

The electricity storage device is not limited to the rechargeable battery 10, but may be capacitors such as an electric double-layer capacitor or a lithium-ion capacitor.

DESCRIPTION OF THE REFERENCE NUMERALS

L . . . Stacking Direction; W . . . Conduction Part; X . . . Arrangement Direction; 10 . . . Rechargeable Battery As Electricity Storage Device; 11 . . . Case; 12 . . . Electrode Assembly; 12b . . . Tab-Side End Face; 15 . . . Lid Member As Wall Portion; 16 . . . Positive Terminal As Electrode Terminal; 17 . . . Negative Terminal As Electrode Terminal; 21 . . . Positive Electrode; 22a, 32a . . . Side; 25, 35 . . . Tab; 31 . . . Negative Electrode; 36 . . . Tab Bundle; 36a . . . First Bent Portion; 36b . . . Extended Portion; 51 . . . Conductive Member; 52 . . . Fixed Piece; 52b . . . First Surface; 52c . . . Second Surface; 53 . . . Connecting Piece; 53c . . . Outer Surface; 53d . . . Inner Surface; 58 . . . Folded Portion; 60 . . . Step; 70 . . . Electrode Terminal.

The invention claimed is:

1. A method for manufacturing an electricity storage device, wherein the electricity storage device includes
an electrode assembly, wherein
electrodes of different polarities are stacked while being insulated from each other,
each electrode includes a tab, which protrudes from one side of the electrode, and
the electrode assembly includes a tab-side end face formed by collecting the sides of the electrodes,
tab bundles, which protrude from the tab-side end face of the electrode assembly, wherein each tab bundle includes the tabs stacked on one another;
a case, which accommodates the electrode assembly and the tab bundles;
electrode terminals, which are secured to a wall portion of the case opposed to the tab bundles and transmit and receive electricity to and from the electrode assembly; and
conductive members, which electrically connect the tab bundles to the electrode terminals and are mounted on the wall portion in a state in which the conductive members are insulated from the wall portion, wherein
each conductive member includes
a fixed piece, which overlaps with the wall portion when the wall portion is viewed from an outer surface and includes a first surface and a second surface, which is parallel to the first surface, and
a connecting piece, which intersects the fixed piece and protrudes in a direction away from the wall portion,
the method comprising:
stacking the electrodes of different polarities in a state in which the electrodes are insulated from one another to form the electrode assembly and stacking the tabs;
mounting the conductive members on the wall portion with the first surface of each fixed piece opposed to the wall portion;
after mounting the conductive members on the wall portion, joining the tabs to a distal end section of each connecting piece in a state in which the tabs are stacked on a first end in a stacking direction of the electrode assembly to form a conduction part that electrically connects the tabs and the associated conductive member; and
after forming the conduction part, folding the distal end section of each connecting piece such that the distal end section of the connecting piece approaches the second surface of the fixed piece to fold the tabs at a section closer to a distal end than the conduction part.

2. The method for manufacturing the electricity storage device according to claim 1, wherein
each connecting piece includes an outer surface continuous with the first surface of the fixed piece and an inner surface continuous with the second surface of the fixed piece,
the method further comprising, after joining the tabs to the inner surface of each connecting piece, folding the distal end section of each connecting piece such that the inner surface of the connecting piece approaches the second surface of the fixed piece to cover a distal end section of the tabs from a side facing the electrode assembly.

3. The method for manufacturing the electricity storage device according to claim 1, further comprising:
before joining the tabs to each connecting piece, forming the connecting piece to protrude from the associated fixed piece in a direction orthogonal to the wall portion; and
after joining the tabs to each connecting piece, folding the distal end section of each connecting piece such that the connecting piece overlaps with the wall portion and is parallel to the wall portion.

* * * * *